(12) United States Patent
Tyler

(10) Patent No.: US 11,664,144 B2
(45) Date of Patent: May 30, 2023

(54) SINGLE COIL APPARATUS AND METHOD

(71) Applicant: G.W. Lisk Company, Inc., Clifton Springs, NY (US)

(72) Inventor: Jeffery Tyler, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 17/053,205

(22) PCT Filed: May 7, 2019

(86) PCT No.: PCT/US2019/031143
§ 371 (c)(1),
(2) Date: Nov. 5, 2020

(87) PCT Pub. No.: WO2019/217439
PCT Pub. Date: Nov. 14, 2019

(65) Prior Publication Data
US 2021/0142936 A1 May 13, 2021

Related U.S. Application Data

(60) Provisional application No. 62/667,945, filed on May 7, 2018.

(51) Int. Cl.
*H01F 7/16* (2006.01)
*H02K 1/34* (2006.01)
(Continued)

(52) U.S. Cl.
CPC .......... *H01F 7/1615* (2013.01); *H01F 7/081* (2013.01); *H02K 1/34* (2013.01); *H02K 33/16* (2013.01)

(58) Field of Classification Search
CPC .. H01F 7/1615; H01F 7/081; H01F 2007/085; H01F 7/13; H01F 7/16;
(Continued)

(56) References Cited

U.S. PATENT DOCUMENTS 4,808,955 A 2/1989 Godkin et al.
5,257,014 A 10/1993 Zimmerman
(Continued)

FOREIGN PATENT DOCUMENTS

CN 101013841 A * 8/2007
DE 102012213052 A1 * 5/2014 ........... B29C 45/281
(Continued)

OTHER PUBLICATIONS

Machine translation of EP0569669A1 (Year: 1993).*
(Continued)

*Primary Examiner* — Bernard Rojas
(74) *Attorney, Agent, or Firm* — Timothy W. Menasco, Esq.; Harter Secrest & Emery LLP

(57) ABSTRACT

Presented are a single coil apparatus and a method of forming. An exemplary apparatus includes solenoid assembly. The solenoid assembly includes a core tube extending along a longitudinal axis. The solenoid assembly further includes a first magnet and a second magnet located outside the core tube, the first magnet spaced along the longitudinal axis from the second magnet, and an excitation coil disposed radially outward of the first magnet and the second magnet.

24 Claims, 23 Drawing Sheets

Figure 1:
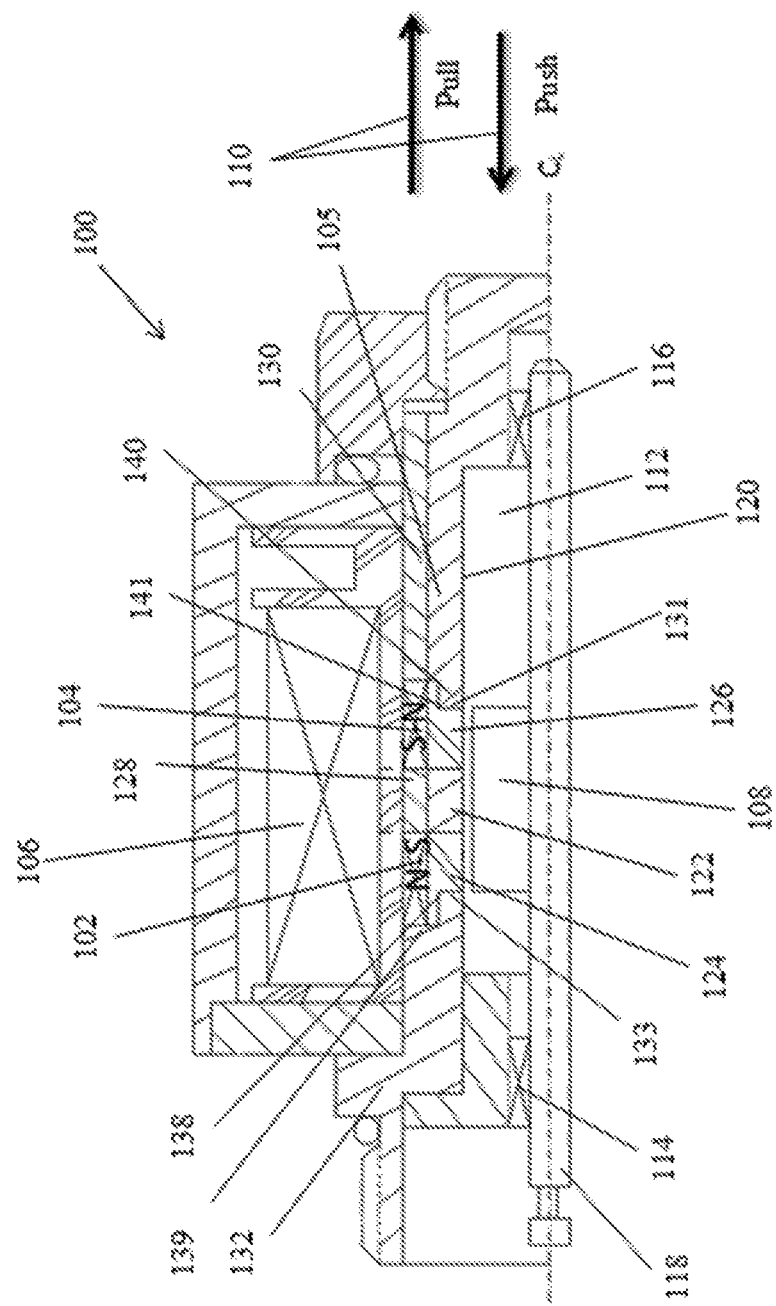

(51) Int. Cl.
*H02K 33/16* (2006.01)
*H01F 7/08* (2006.01)

(58) Field of Classification Search
CPC .......... H02K 1/34; H02K 33/16; H02K 7/00; H02K 41/02
See application file for complete search history.

(56) References Cited

U.S. PATENT DOCUMENTS

| | | |
|---|---|---|
| 6,313,726 B1 | 6/2001 | Golovatai-Schmidt |
| 2002/0195884 A1 | 12/2002 | Ichii et al. |
| 2005/0057101 A1 | 3/2005 | Nakagawa et al. |
| 2015/0349619 A1 | 12/2015 | Degner et al. |

FOREIGN PATENT DOCUMENTS

| | | | | |
|---|---|---|---|---|
| EP | 569669 A1 | * | 11/1993 | .......... H01F 7/1615 |
| JP | 2000-166209 A | | 6/2000 | |

OTHER PUBLICATIONS

Machine translation of DE102012213052A1 (Year: 2014).*
Machine translation of (Year: 2007).*
International Search Report for International Application No. PCT/US2019/031143, completed Jun. 28, 2019, dated Jul. 9, 2019.

* cited by examiner

800: providing a core tube extending along a longitudinal axis, the core tube having a first ferromagnetic end section with a first confronting end and longitudinally spaced from a second ferromagnetic end section with a second confronting end, a first nonmagnetic section adjacent the first confronting end and a second nonmagnetic section adjacent the second confronting end, a first ferrous spacer longitudinally intermediate the first nonmagnetic section and the second nonmagnetic section; providing a first magnet and a second magnet located outside the core tube, the first magnet spaced along the longitudinal axis from the second magnet wherein a second ferrous spacer is longitudinally intermediate the first magnet and the second magnet, and wherein the first nonmagnetic section is radially inward of the first magnet and the second nonmagnetic section is radially inward of the second magnet, and the first ferrous spacer is radially inward of the second ferrous spacer, and providing an excitation coil disposed radially outward of the first magnet and the second magnet 802: wherein the first ferrous spacer is located at the same longitudinal position as the second ferrous spacer 804: wherein proximal poles of the first magnet and the second magnet are like 806: wherein the first nonmagnetic section contacts the first confronting end of the first ferromagnetic end section of the core tube 808: wherein the second nonmagnetic section contacts the second confronting end of the second ferromagnetic end section of the core tube 810: wherein the first nonmagnetic section contacts the first confronting end of the ferromagnetic end section of the core tube such that a portion of the first ferromagnetic end section of the core tube radially underlies a portion of the first nonmagnetic section 812: wherein the second nonmagnetic section contacts the second confronting end of the second ferromagnetic end section of the core tube such that a portion of the second ferromagnetic end section of the core tube radially underlies a portion of the second nonmagnetic section

FIG. 8

SINGLE COIL APPARATUS AND METHOD

BACKGROUND OF THE INVENTION

Field of the Invention

The present disclosure relates to a single coil apparatus and method. The present disclosure relates more specifically to a single coil solenoid assembly apparatus and method.

Description of Related Art

Electromechanical solenoids include a electromagnetically inductive coil, wound around a moveable steel or iron armature. The coil is shaped such that the armature can be moved in and out of the center, altering the coil's inductance and thereby becoming an electromagnet. The armature is used to provide a mechanical force to some mechanism, such as an actuator. Solenoids may be controlled directly by a controller circuit, and thus have very fast response times.

BRIEF SUMMARY OF THE INVENTION

In view of the foregoing, it is an object of the present disclosure to provide a single coil apparatus and method.

A first exemplary embodiment of the present disclosure provides an apparatus. The apparatus includes a core tube extending along a longitudinal axis, the core tube having a first ferromagnetic end section with a first confronting end longitudinally spaced from a second ferromagnetic end section with a second confronting end, a first non-ferromagnetic section adjacent the first confronting end and a second nonmagnetic section adjacent the second confronting end, a first ferromagnetic spacer longitudinally intermediate the first non-ferromagnetic section and the second non-ferromagnetic section. The apparatus further includes a first magnet and a second magnet located outside the core tube, the first magnet spaced along the longitudinal axis from the second magnet wherein a second ferromagnetic spacer is longitudinally intermediate the first magnet and the second magnet, and wherein the first non-ferromagnetic section is radially inward of the first magnet and the second non-ferromagnetic section is radially inward of the second magnet, and the first ferromagnetic spacer is radially inward of the second ferromagnetic spacer, and an excitation coil is disposed radially outward of the first magnet and the second magnet.

A second exemplary embodiment of the present disclosure provides a method of forming. The method includes providing a core tube extending along a longitudinal axis, the core tube having a first ferromagnetic end section with a first confronting end longitudinally spaced from a second ferromagnetic end section with a second confronting end, a first non-ferromagnetic section adjacent the first confronting end and a second non-ferromagnetic section adjacent the second confronting end, a first ferromagnetic spacer longitudinally intermediate the first non-ferromagnetic section and the second non-ferromagnetic section. The method further includes providing a first magnet and a second magnet located outside the core tube, the first magnet spaced along the longitudinal axis from the second magnet wherein a second ferromagnetic spacer is longitudinally intermediate the first magnet and the second magnet, and wherein the first non-ferromagnetic section is radially inward of the first magnet and the second non-ferromagnetic section is radially inward of the second magnet, and the first ferromagnetic spacer is radially inward of the second ferromagnetic spacer.

The method still further includes providing an excitation coil disposed radially outward of the first magnet and the second magnet.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

BRIEF DESCRIPTION OF THE SEVERAL VIEWS OF THE DRAWING(S)

FIG. 1 presents a cross-sectional view of a device suitable for use in practicing exemplary embodiments of the present disclosure.

Figure 2:
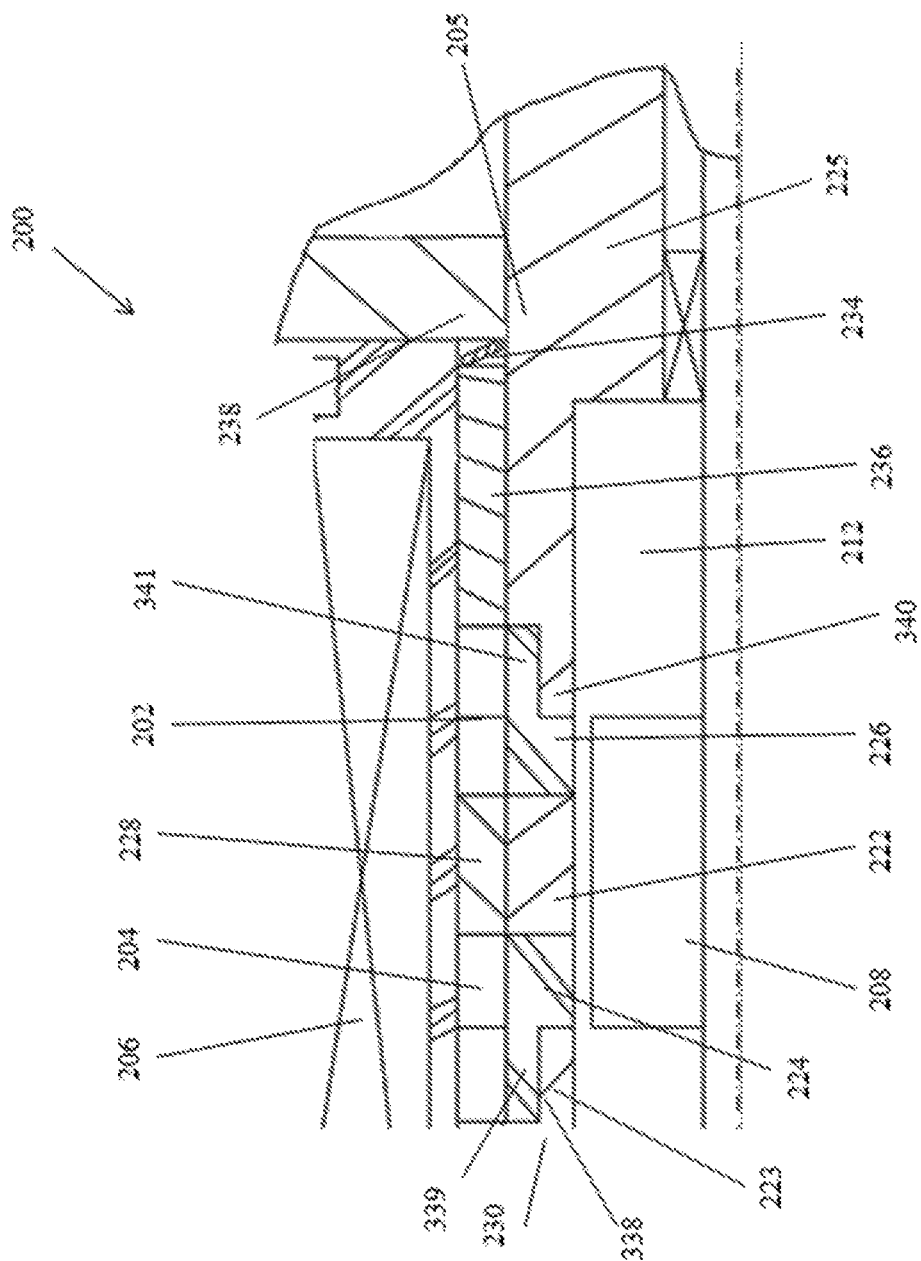

FIG. 2 presents a close up cross-sectional view of a portion of a device suitable for use in practicing exemplary embodiments of the present disclosure.

Figure 3:
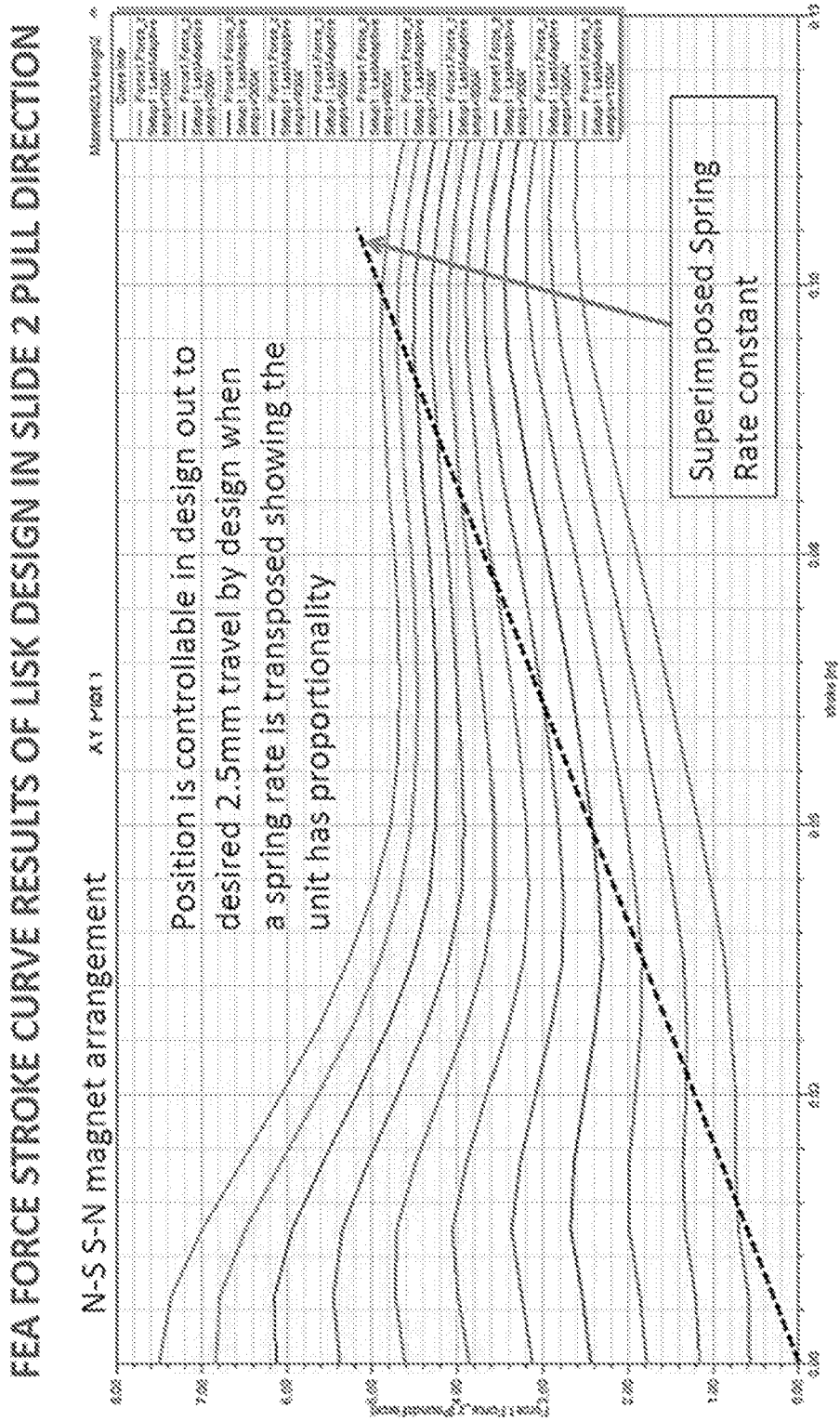

FIG. 3 presents a graph illustrating a stroke curve of a device suitable for use in practicing exemplary embodiments of the present disclosure.

Figure 4:
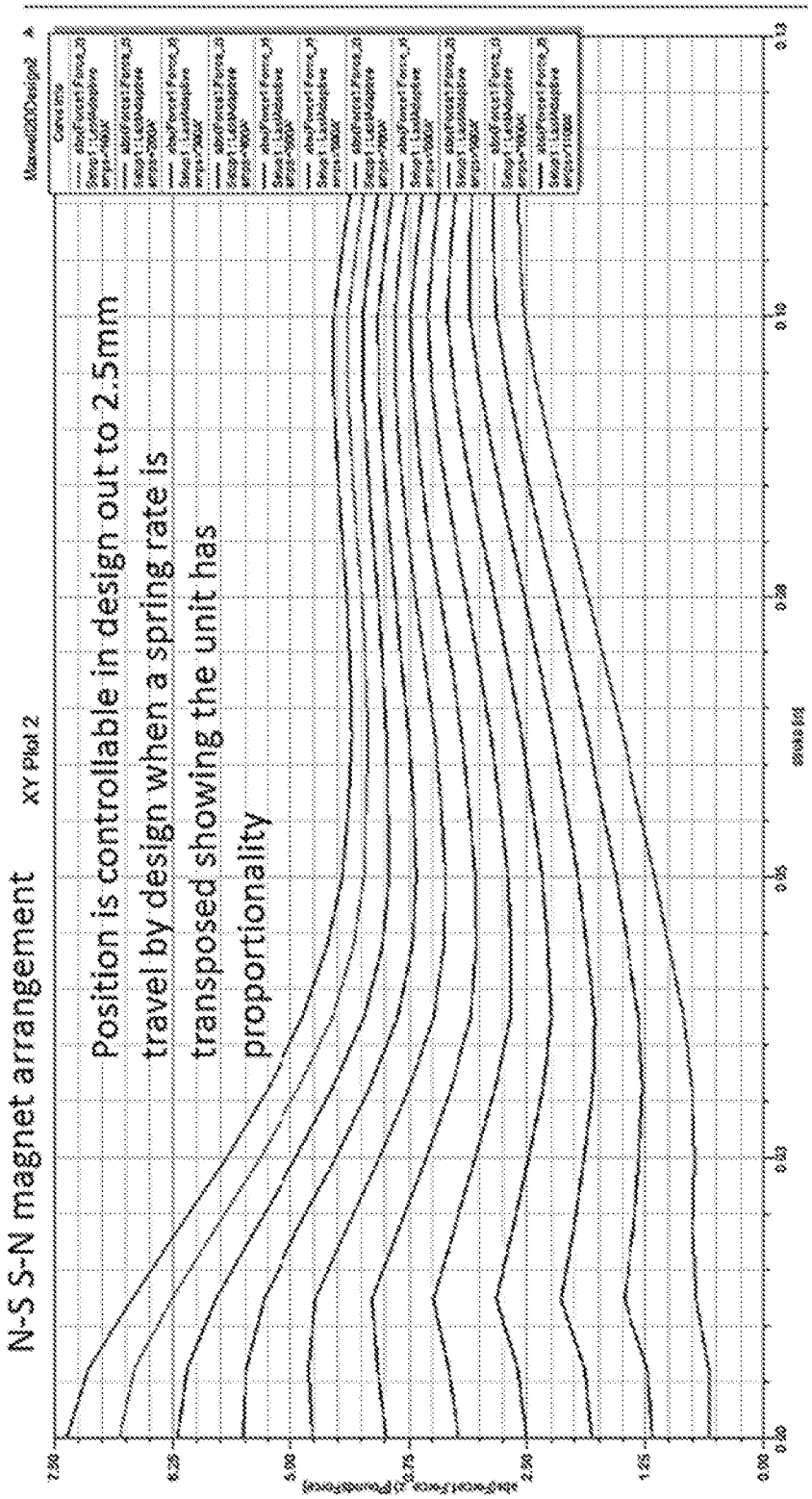

FIG. 4 presents a graph illustrating another stroke curve of a device suitable for use in practicing exemplary embodiments of the present disclosure.

Figure 5:
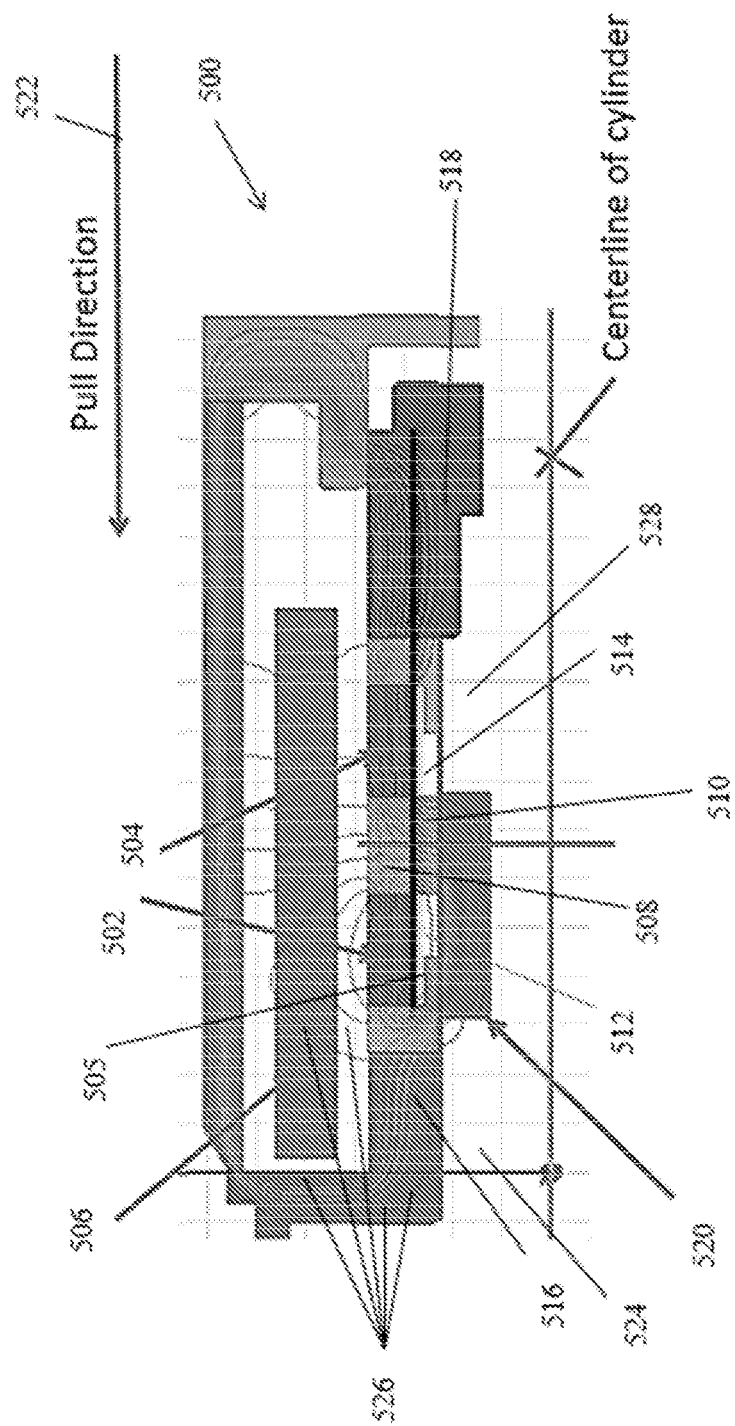

FIG. 5 presents a cross-sectional view of an alternative embodiment of a device suitable for use in practicing exemplary embodiments of the present disclosure.

Figure 6:
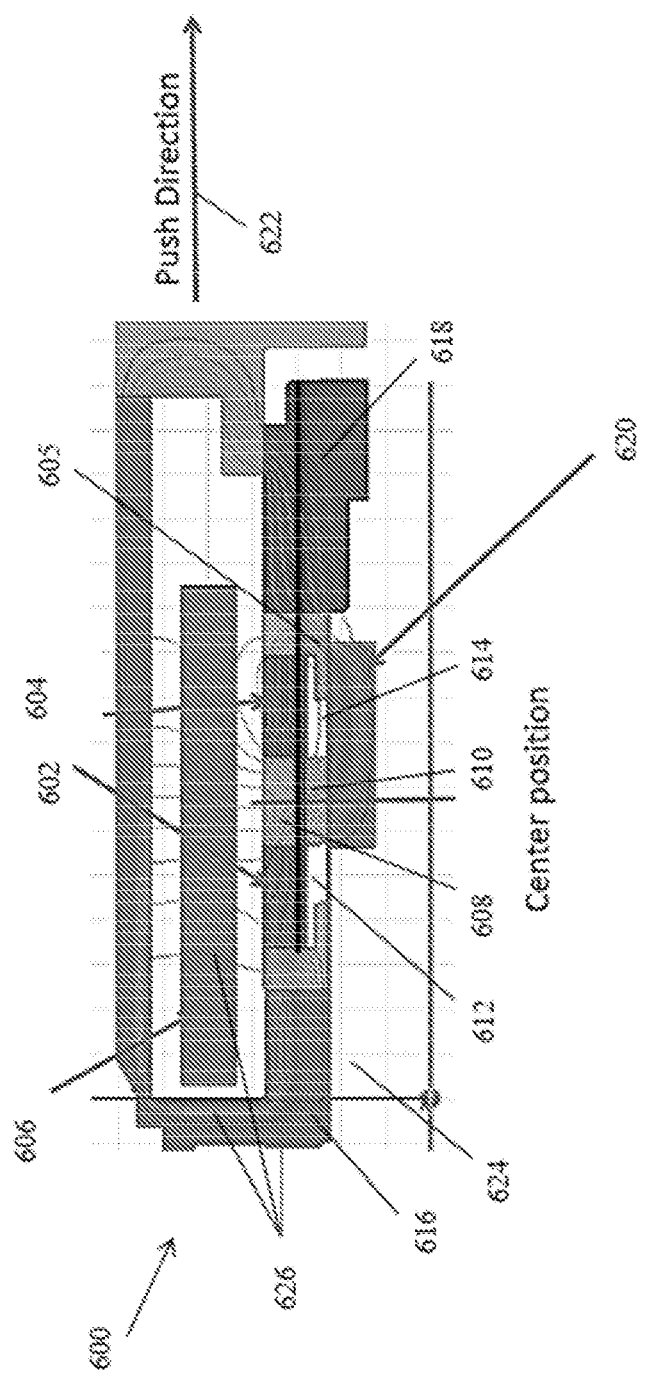

FIG. 6 presents a cross-sectional view of the alternative embodiment of a device in the push direction suitable for use in practicing exemplary embodiments of the present disclosure.

Figure 7:
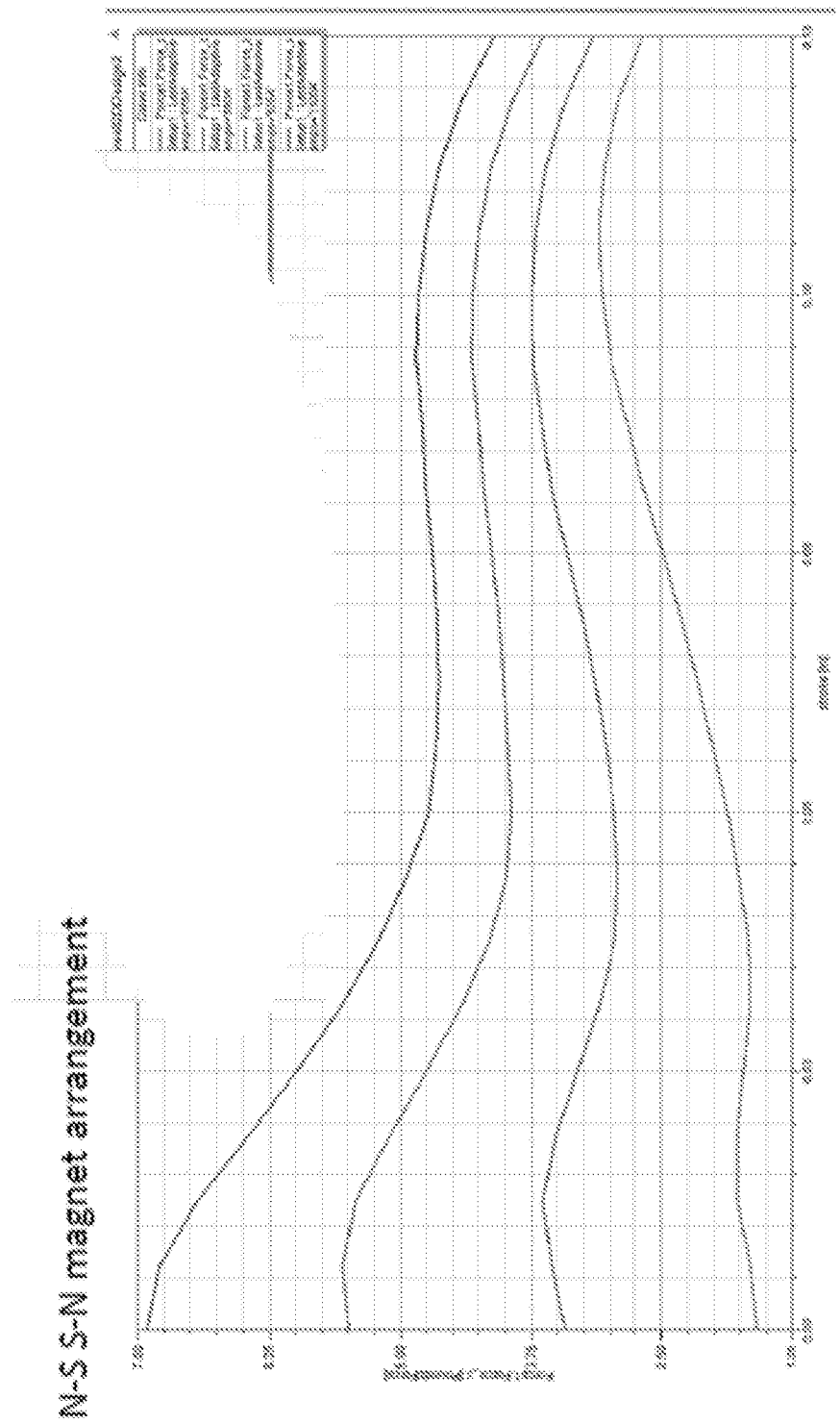

FIG. 7 presents a graph illustrating another stroke curve of a device with a gap suitable for use in practicing exemplary embodiments of the present disclosure.

FIG. 8 presents a logic flow diagram in accordance with a method and apparatus for performing exemplary embodiments of the present disclosure.

Figure 9:
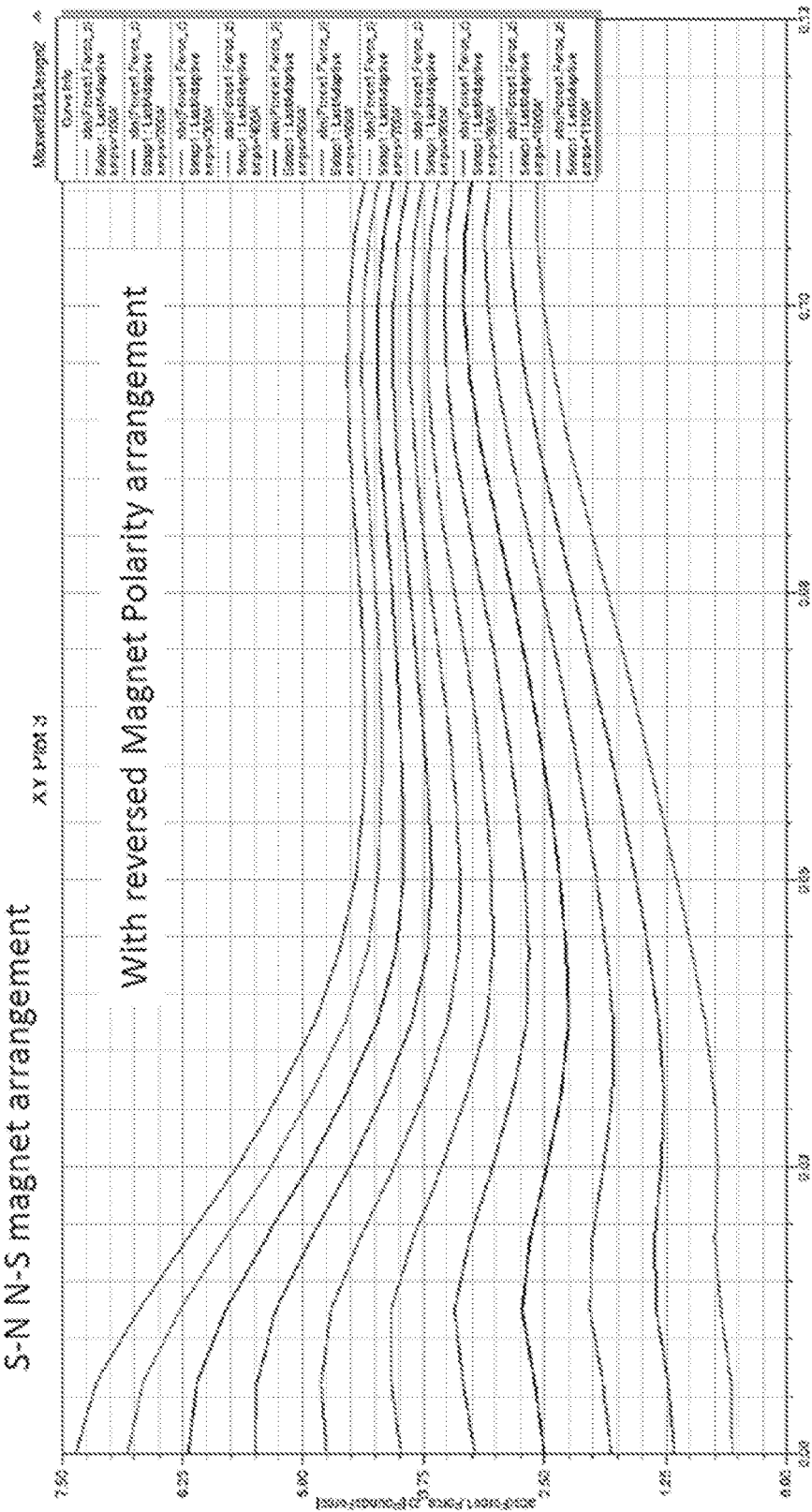

FIG. 9 presents a graph illustrating a stroke curve of a device with reversed polarity in the push direction suitable for use in practicing exemplary embodiments of the present disclosure.

Figure 10:
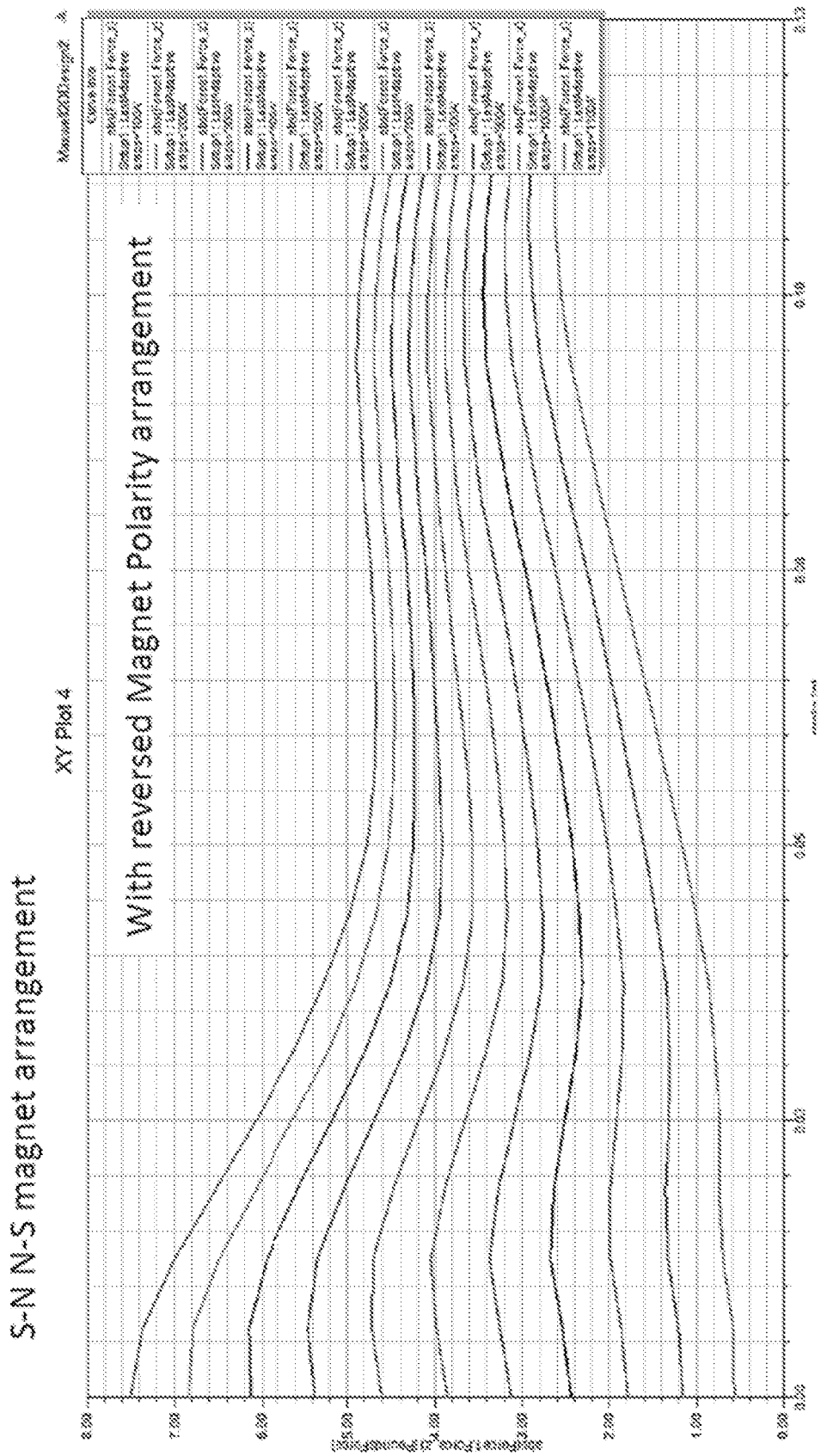

FIG. 10 presents a graph illustrating another stroke curve of a device with reversed polarity in the pull direction suitable for use in practicing exemplary embodiments of the present disclosure.

Figure 11:
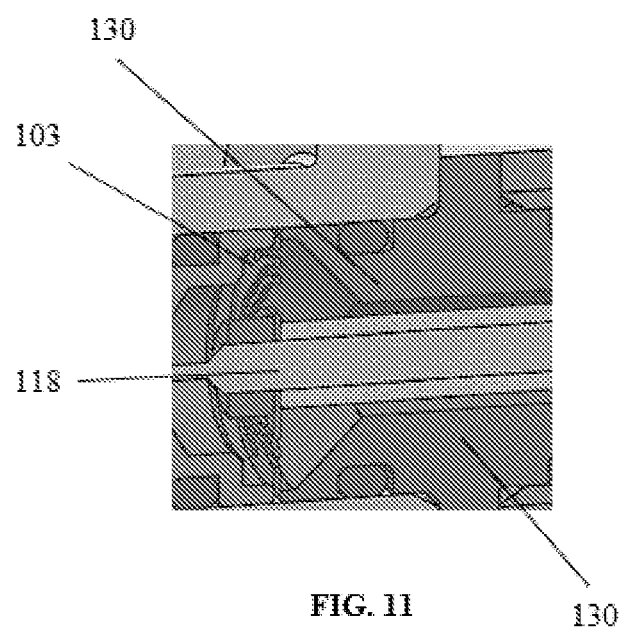

FIG. 11 presents an exemplary flexible bearing suitable for use in practicing exemplary embodiments of the present disclosure.

Figure 12:
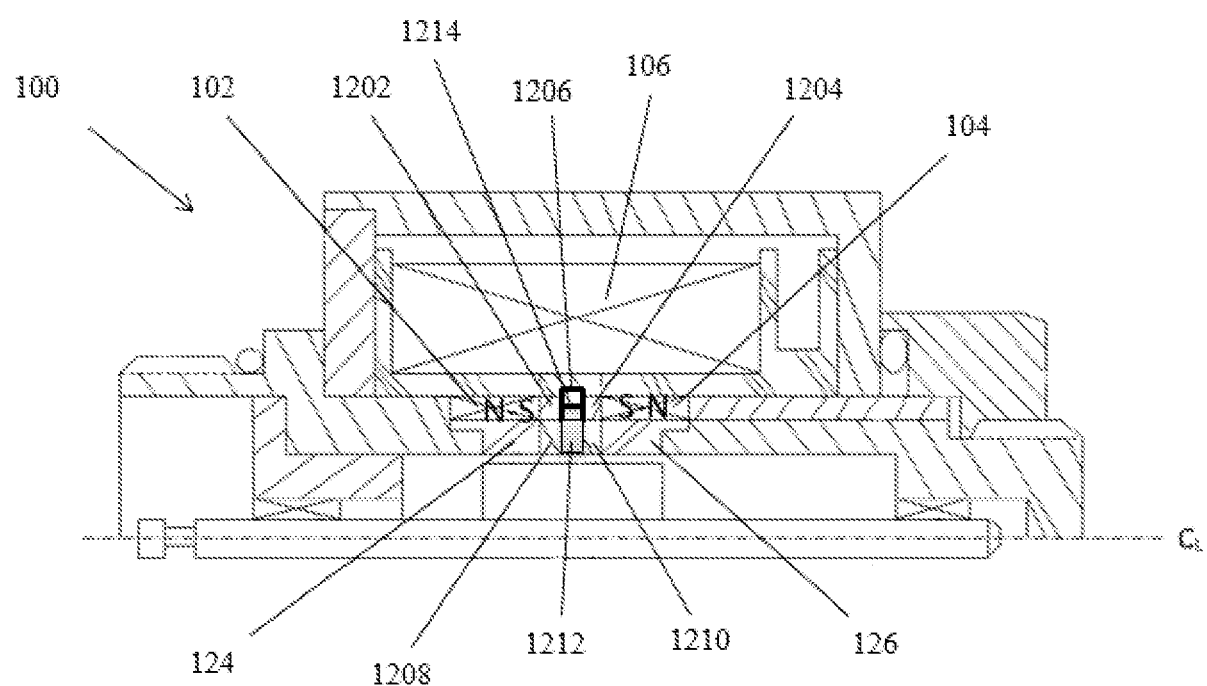

FIG. 12 presents an exemplary cross-sectional view of another alternative embodiment of a device suitable for use in practicing exemplary embodiments of the present disclosure.

Figure 13:
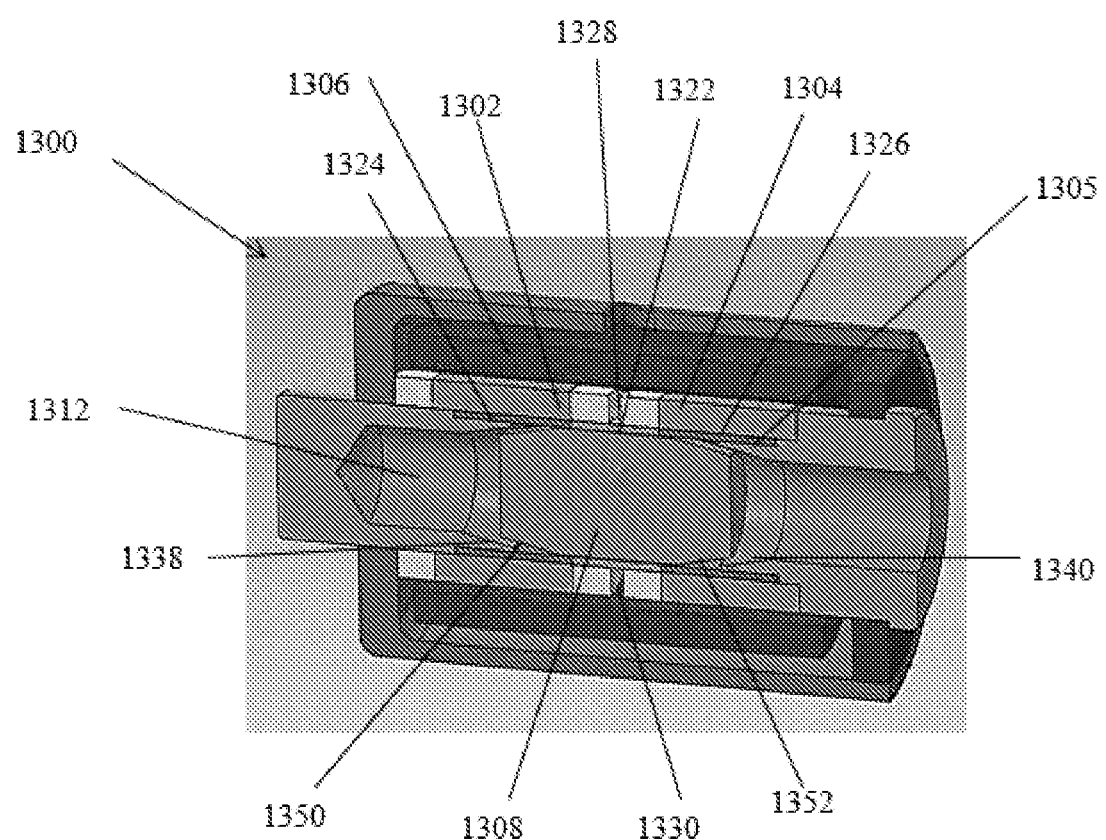

FIG. 13 presents an exemplary cross-sectional view of yet another alternative embodiment of a device suitable for use in practicing exemplary embodiments of the present disclosure.

Figure 14:
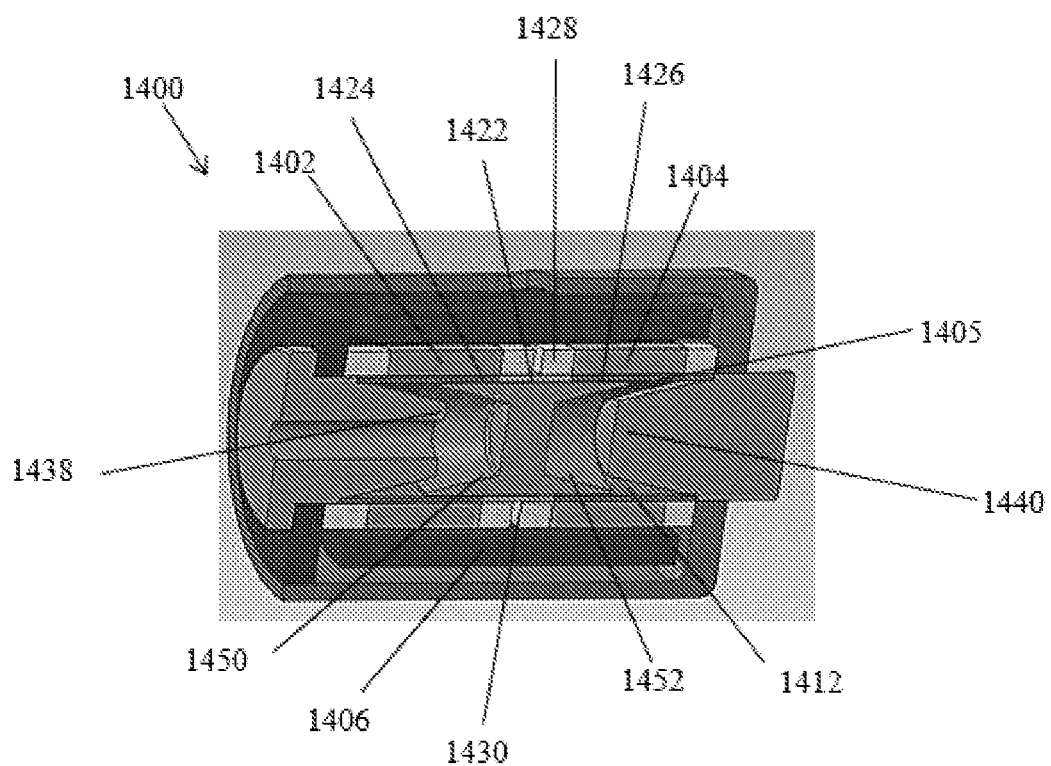

FIG. 14 presents an exemplary cross-sectional view of a further alternative embodiment of a device suitable for use in practicing exemplary embodiments of the present disclosure.

Figure 15:
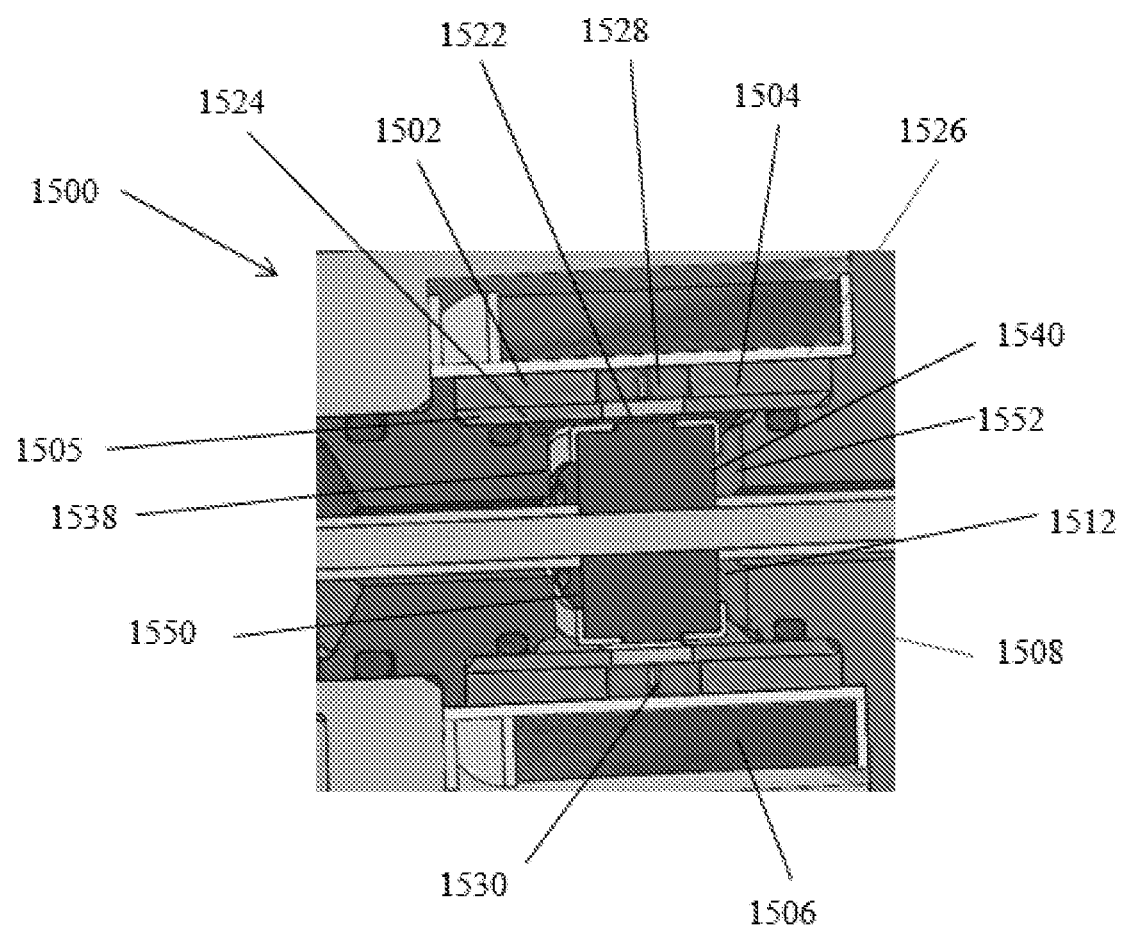

FIG. 15 presents an exemplary cross-sectional view of an even further alternative embodiment of a device suitable for use in practicing exemplary embodiments of the present disclosure.

Figure 16:
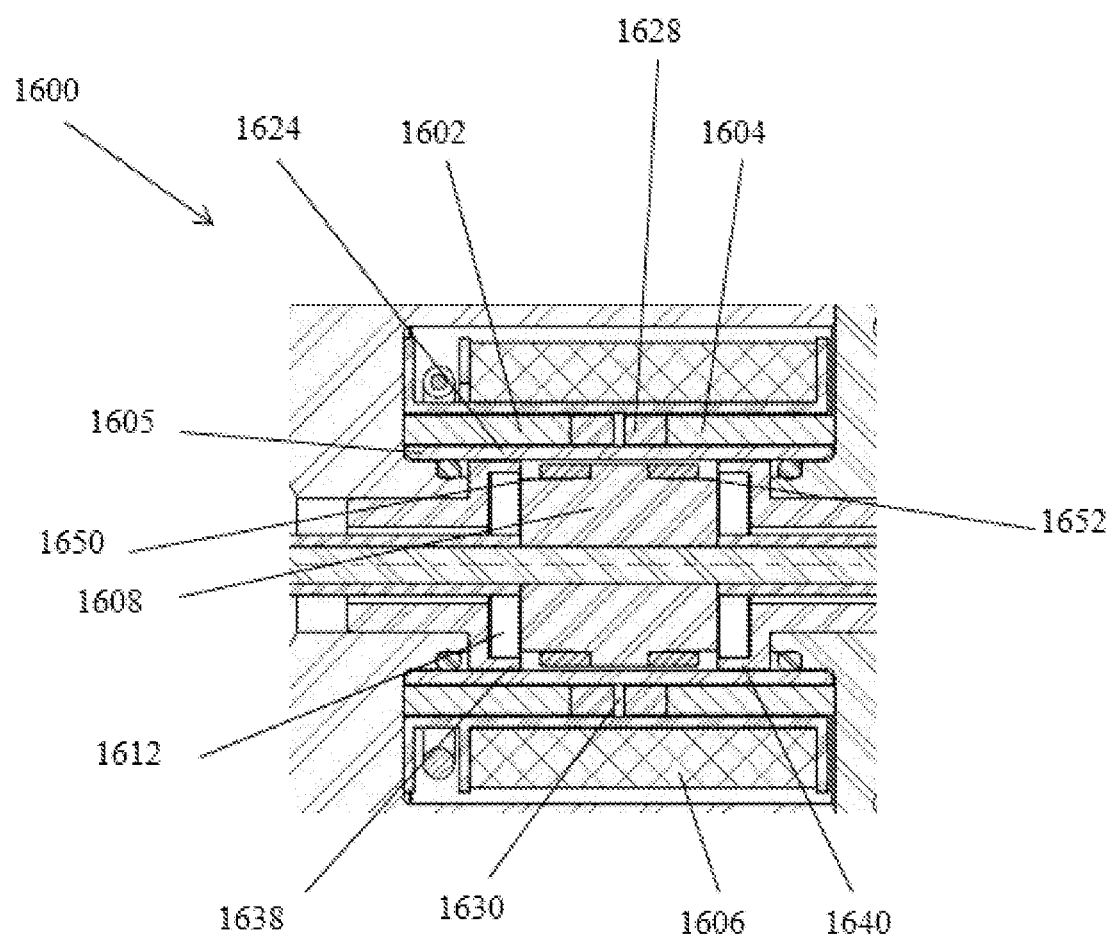

FIG. 16 presents an exemplary cross-sectional view of another alternative embodiment of a device suitable for use in practicing exemplary embodiments of the present disclosure.

Figure 17:
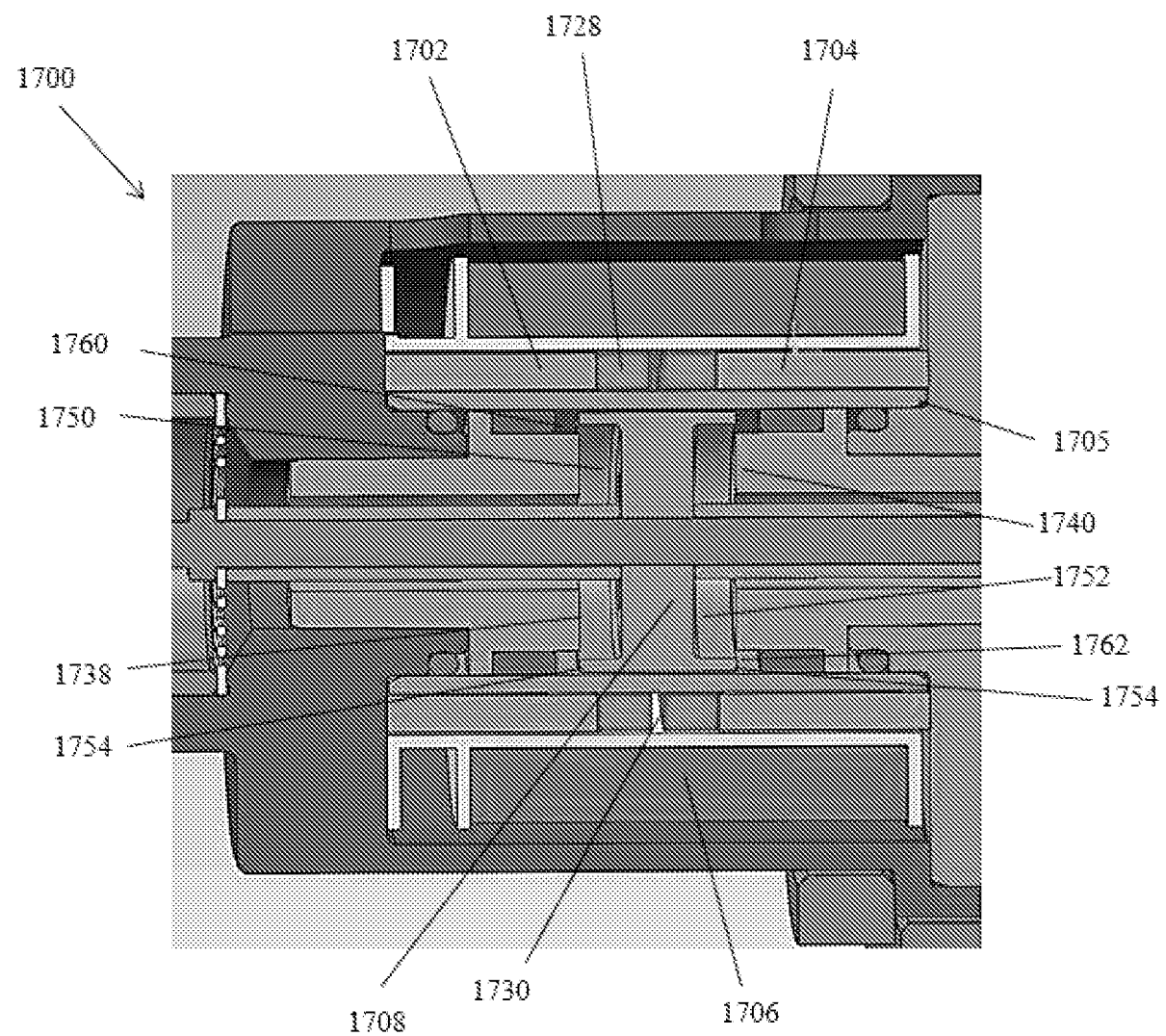

FIG. 17 presents an exemplary cross-sectional view of an exemplary device having counter bores suitable for use in practicing exemplary embodiments of the present disclosure.

Figure 18:
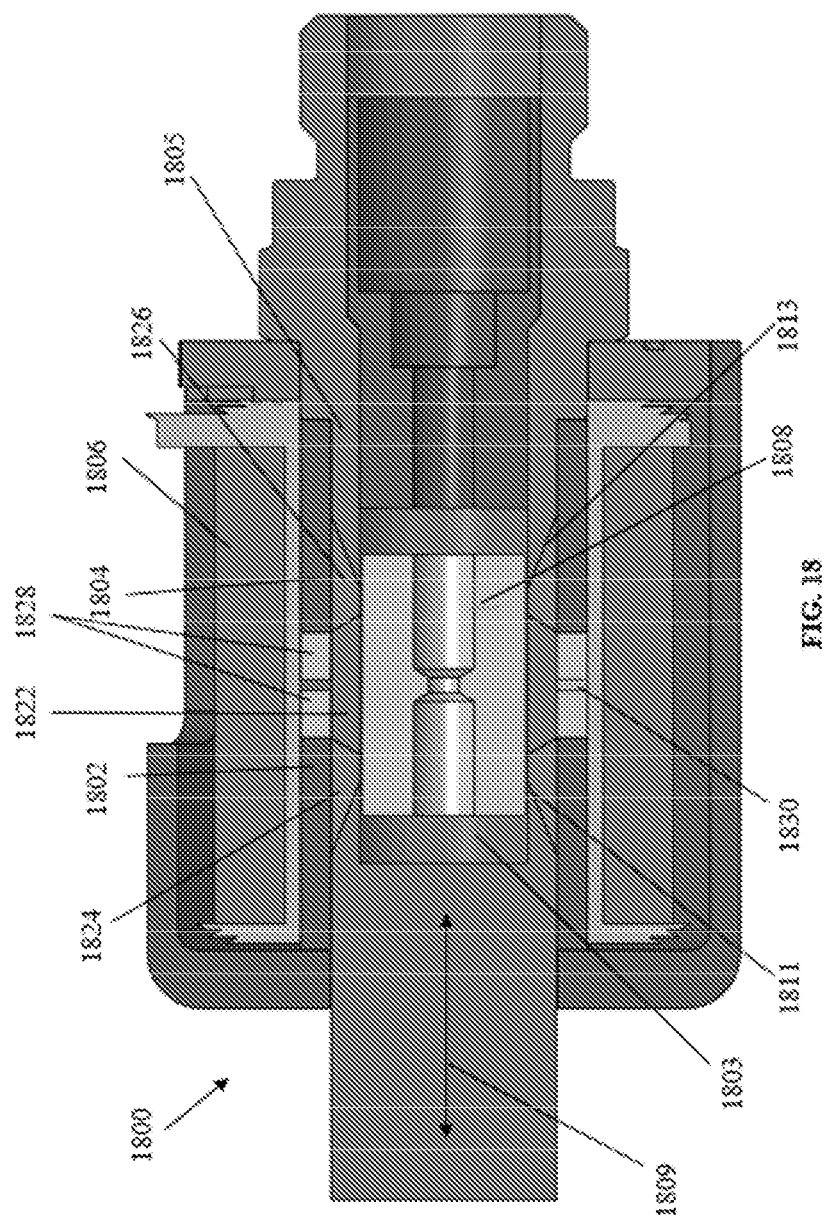

FIG. 18 presents an exemplary cross-sectional view of an exemplary device suitable for use in practicing exemplary embodiments of the present disclosure.

Figure 19:
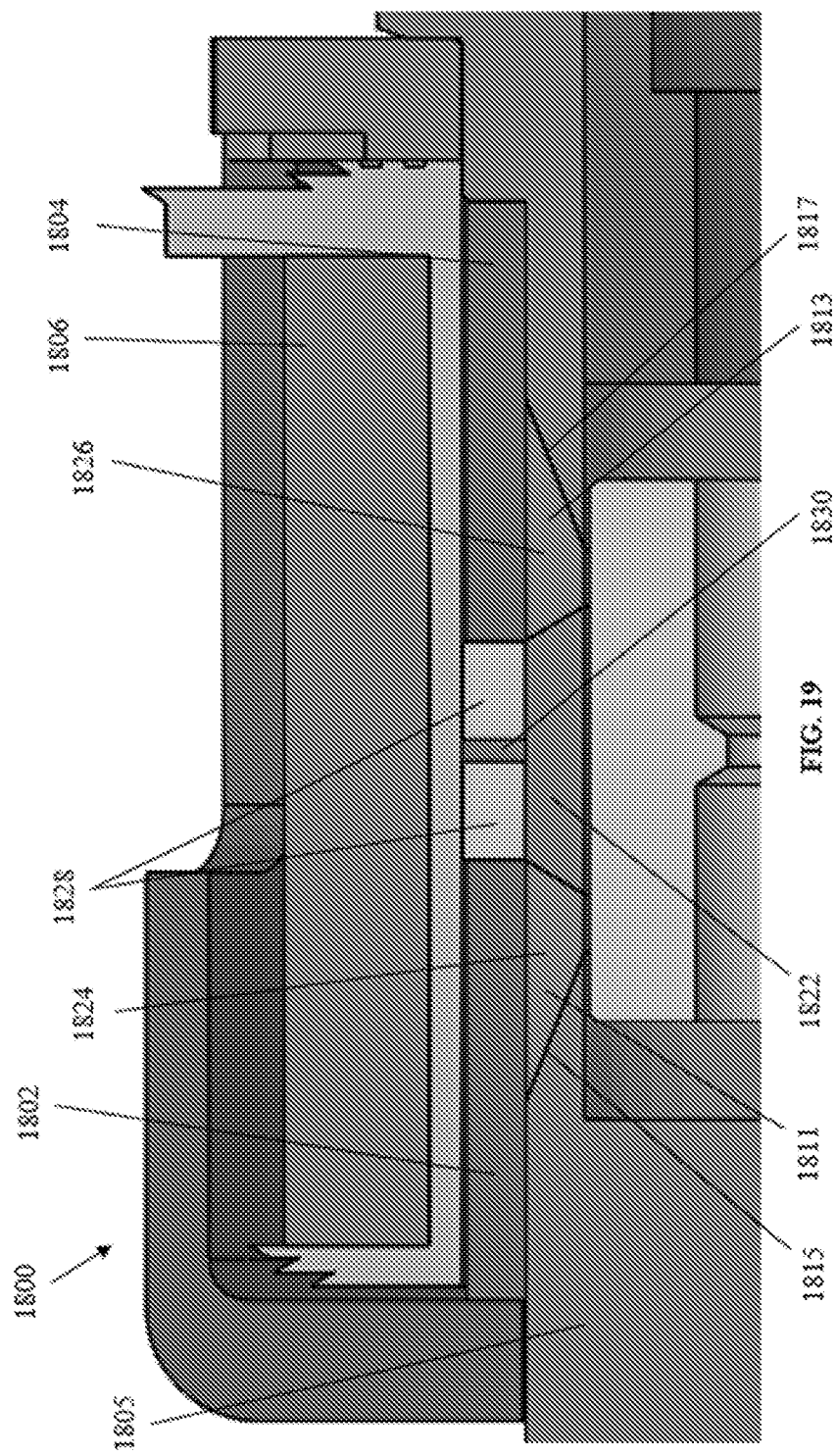

FIG. 19 presents an exemplary close-up cross-sectional view of an exemplary device suitable for use in practicing exemplary embodiments of the present disclosure.

Figure 20:
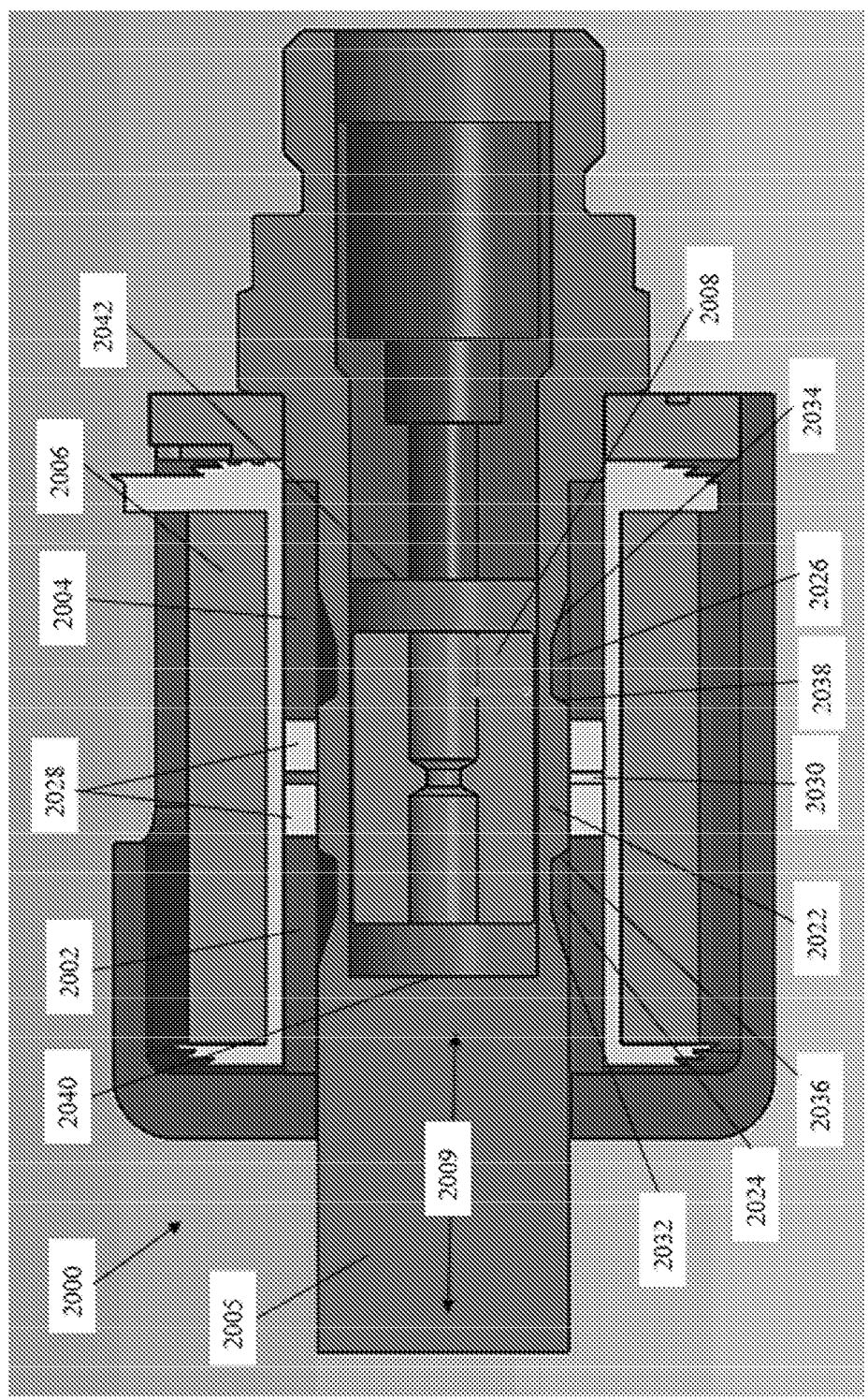

FIG. 20 presents an exemplary cross-sectional view of an exemplary device having spacers suitable for use in practicing exemplary embodiments of the present disclosure.

Figure 21:
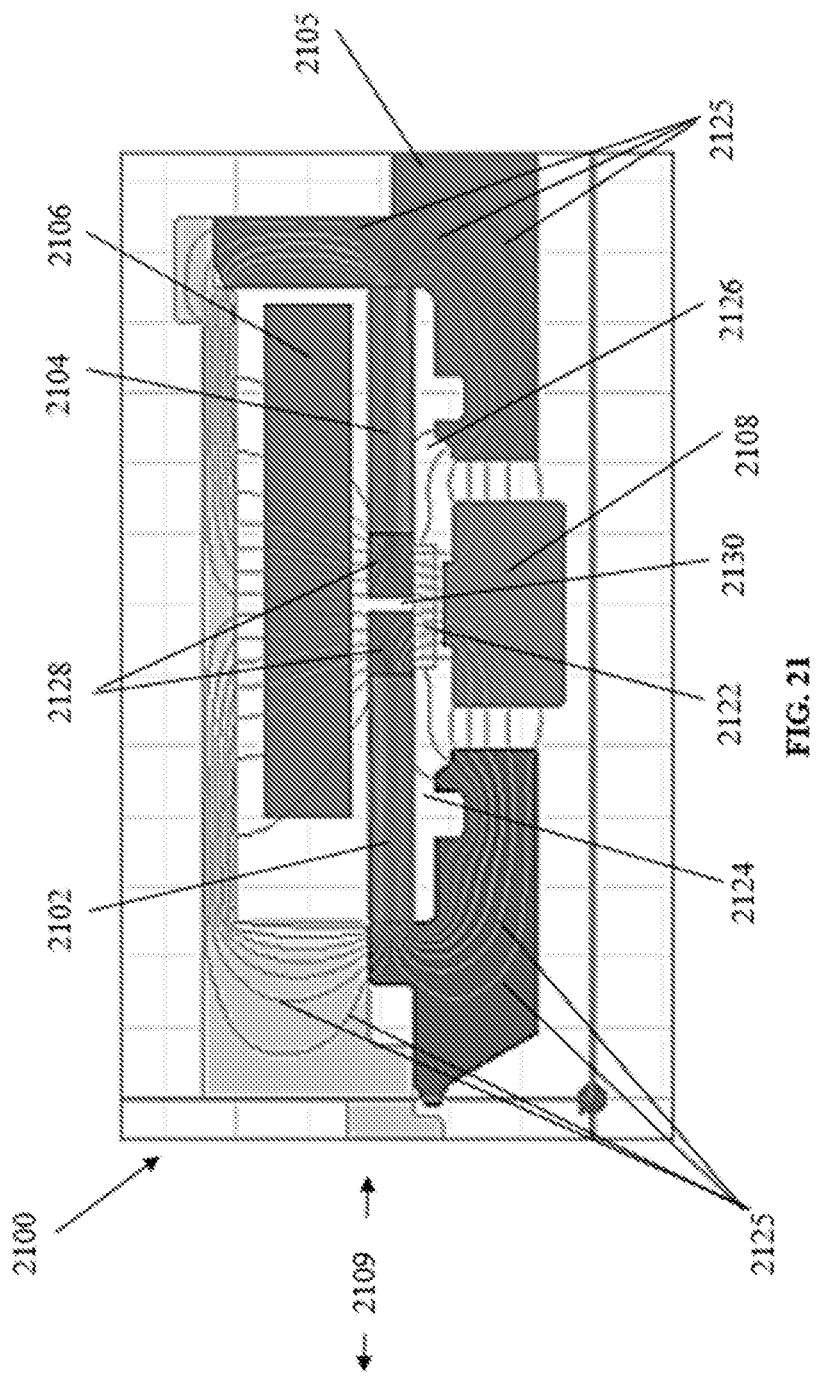

FIG. 21 presents an exemplary cross-sectional view of an exemplary device with magnetic flux lines suitable for use in practicing exemplary embodiments of the present disclosure.

Figure 22:
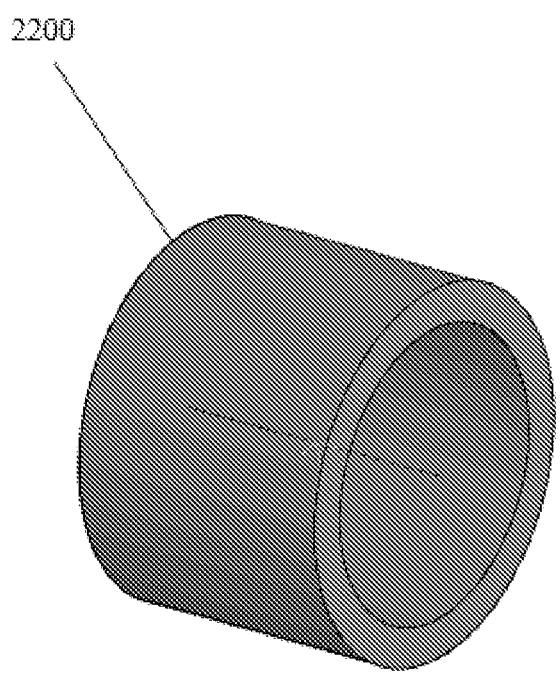

FIG. 22 presents a perspective view of an exemplary cylindrical magnet suitable for use in practicing exemplary embodiments of the present disclosure.

Figure 23:
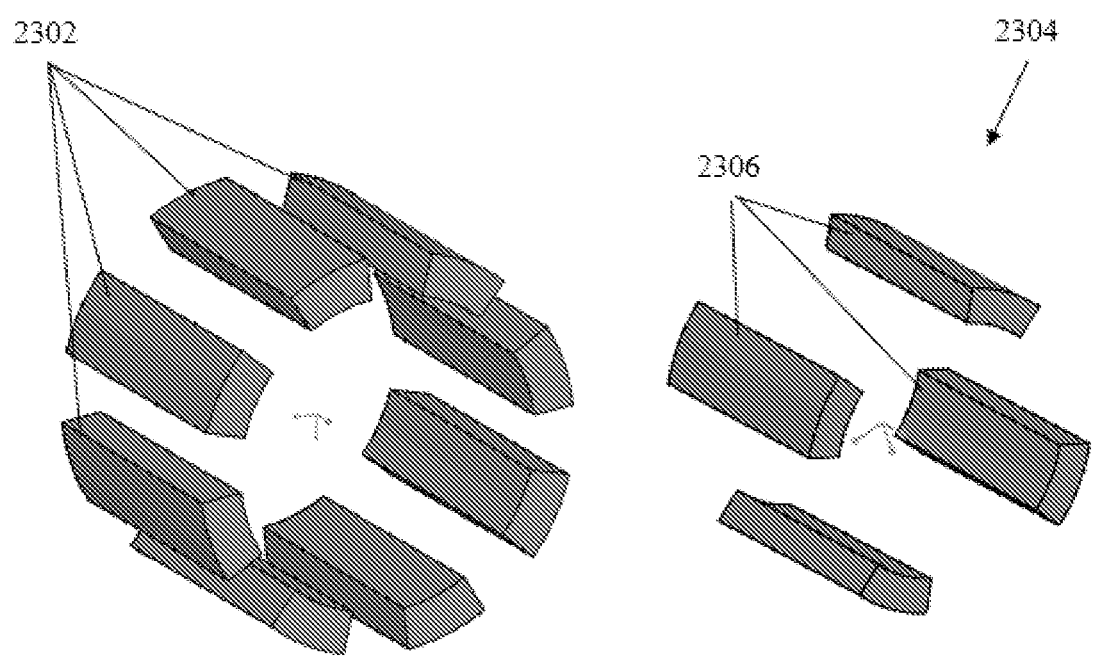

FIG. 23 presents a perspective view of an exemplary magnet suitable for use in practicing exemplary embodiments of the present disclosure.

DETAILED DESCRIPTION OF THE INVENTION

Current solenoid designs have a limited stroke range capability. Additionally, current solenoid designs are constructed from many different components. This can make it difficult or simply more costly to manufacture solenoid products. Moreover, current solenoid designs are limited in their application since every valve the solenoid interacts with or mates with needs to be adjusted due to its short stroke capabilities. The actuator that drives the solenoid also has to have its stroke adjusted because of the short working stroke range making it cumbersome to produce products in high volumes. Lastly, the construction of current solenoid designs require a large core diameter, which limits the design to having very low pressure inside the core cavity. Embodiments of the present disclosure seek to cure these issues with current solenoid designs.

Embodiments of the present disclosure provide a push pull single coil solenoid having a stroke length of +/− 2.5 mm from center. It should be appreciated that embodiments include a single coil solenoid having a stroke length of greater or less than +/−2.5 mm from center provided it is constructed as set forth below. It should be appreciated that the term push pull refers to movement of the armature in two opposite directions through the longitudinal axis of the core tube of the solenoid. Embodiments provide a solenoid having a single coil with magnets located radially outside the core tube, which permits a higher internal core fluid pressure. Embodiments allow for a higher internal core fluid pressure because the magnets are mounted, coupled or affixed radially outside the core tube. Accordingly, this configuration allows the diameter of the core tube to be smaller, which allows for higher internal fluid pressure. Embodiments further provide a core tube having non-magnetic sections, breaks or spacers that circumscribe the core tube. Embodiments of this configuration allow magnetic flux produced by current passing through the coil to travel through the armature into the core tube wall to provide a proportional like force over the entire stroke range of the solenoid.

Embodiments of the present disclosure provide a solenoid having fixed magnets and a single fixed excitation coil and a ferrous armature that is moveable through the longitudinal axis of the solenoid with respect to the fixed magnets and the fixed excitation coil. Embodiments provide that the direction of movement of the armature is determined by the polarity of the electrical signal applied to the single excitation coil, the direction of the winding of the single excitation coil (e.g., clockwise or counterclockwise), and the orientation of the magnets polarity as assembled (e.g., N-S to S-N, or S-N to N-S).

Embodiments of the core tube of the solenoid utilizes a multi piece design of ferrous and non-ferrous materials that are adhered together by brazing, welding, or the like such that it is operable to form a core tube cavity that can withstand pressurized fluid. Embodiments include a core construction made of a single ferrous material having gaps radially inward of the magnets that can be utilized with magnetic shunts to contain internal fluid pressure.

Embodiments provide that the armature is moveable along on a low friction bearing material between the interior core wall and the armature. Embodiments include the armature being suspended on a rod maintained in the radial center of the core tube with bearings located on stop ends or flexible bearings. The flexible bearings (also referred to as a meandering spring) aide in spring centering or urging the armature to its zero position when the coil is not powered. In an alternative embodiment, the solenoid may not include any bearings, but includes a friction core liner being located between the armature and the interior wall of the core tube. In yet another embodiment, bearings or low-friction coatings can be applied to the portion of the armature that contacts the interior wall of the core tube.

Embodiments of a solenoid include two cylindrical magnets positioned radially outside of the core tube. Between the two cylindrical magnets along the longitudinal axis are two ferrous metal spacers separated by a gap. Embodiments include the magnets and spacer(s) being secured radially outward from the core tube and radially inward from the excitation coil. Embodiments of magnets include a uniform cylindrically shaped magnet or segmented magnets that when combined form a cylinder. In one embodiment, the segmented magnets when combined form a complete cylinder. In another embodiment, the segmented magnets when combined do not form a complete cylinder. Rather, in this embodiment the segmented magnets in practice will be evening spaced around the core tube. The number of segment magnets will depend on the desired force to be generated by solenoid. Accordingly, spacing between the magnet segments will be dependent on the number of segments utilized and their size with relation to the circumference of the core tube.

Embodiments of the present disclosure allow the force created by the solenoid to be increased in one direction as opposed to the other direction by biasing the excitation coil off center towards one end of the solenoid. Embodiments allow for an excitation coil and ferromagnetic flux path coil assembly to surround the core tube assembly such that they are retained in place by a retention nut or similar device. Thus, embodiments allow for removal of the coil in the event of a coil failure without having to disassemble the core tube, which can cause fluid from the core tube to leak.

Referring to FIG. 1, shown is a cross-sectional view of a device 100 suitable for use in practicing exemplary embodiments of the present disclosure. Generally the device 100, such as in the configuration of a solenoid assembly, includes a core tube 105, a fixed magnet assembly, a single fixed excitation coil assembly and a ferromagnetic armature assembly. The ferromagnetic armature assembly is slideably received within the core tube, wherein the core tube is received within the fixed magnet assembly and the magnet assembly is then slideably received within the coil assembly. The term ferromagnetic includes ferrous materials and includes those material having a high susceptibility to magnetization, the strength of which depends on that of the applied magnetizing field, and which may persist after removal of the applied field. It should be appreciated that embodiments include any ferromagnetic materials described herein being replaced with any material that is comprised of iron based steels, irons, and cast irons. This is the kind of magnetism displayed by iron, and is associated with parallel magnetic alignment of neighboring atoms.

Shown in FIG. 1 is the device 100 having the core tube 105 defining a hollow core 112 extending along a longitudinal axis. The core tube 105 includes a first ferromagnetic end section or piece 130 having a confronting end 131 and a second ferromagnetic end section or piece 132 having a confronting end 133, wherein the confronting ends are longitudinally spaced along the longitudinal axis. The core tube 105 also includes a first non-ferromagnetic section, such as a first spacer 124 adjacent the confronting end 133 and a second non-ferromagnetic section, such as a spacer 126 adjacent to and contacting the confronting end 131. The core tube 105 includes a ferromagnetic central spacer 122 longitudinally intermediate the non-ferromagnetic spacer 124 and the non-ferromagnetic spacer 126. The core tube 105 can be constructed of a multi piece design of ferromagnetic and non-ferromagnetic materials that are affixed, coupled or connected together by brazing, welding, bonded or the like.

In one configuration each of the first and second ferromagnetic end pieces 130, 132 includes a respective axially extending protrusion or shoulder 138, 140 mating with a corresponding axial shoulder 139, 141 of the respective first and second non-ferromagnetic sections 126, 124, wherein the shoulders 138, 140 are radially inward of the shoulders 139, 141 and form a portion of the inside surface of core tube 105. In this regard, the ferromagnetic end piece 130 radially underlies a portion of the non-ferromagnetic section 126 and the ferromagnetic end piece 132 radially underlies a portion of the non-ferromagnetic section 124.

The first and second non-ferromagnetic sections, spacers 126, 124 thus have an inner longitudinal dimension and an outer longitudinal dimension, wherein the outer longitudinal dimension is greater than the inner longitudinal dimension.

The armature assembly is operable to move along the longitudinal axis of the device 100 within the hollow core 112 in response to magnetic flux created by the wound coil 106. The armature assembly includes a push-pull rod 118 and an armature 108. The push-pull rod 118 carrying the armature 108 is disposed within at least a portion of the hollow core 112. The push-pull rod 118 is moveable along the longitudinal axis within hollow core 112.

The armature 108 is disposed on the push-pull rod 118, and defines an outer diameter that is greater than an adjacent portion of the push-pull rod 118.

A first bearing 114 can be located between the push-pull rod 118 and the first ferromagnetic end piece 130, and a second bearing 116 located between the push-pull rod 118 and the second ferromagnetic end piece 132, wherein the hollow core 112 (also referred to as a cavity) is partly defined thereby. In one configuration, the first and the second bearing 114, 116 support the push-pull rod 118. While the solenoid assembly is shown with the first and second bearings 114, 116 it is understood alternative mechanisms can be employed for enabling relative motion between the push-pull rod 118 (and armature) and the core tube 105. It is understood the bearings 116, 114 can be made of ferromagnetic or non-magnetic materials.

In an alternative construction, it is contemplated a low friction core liner 120 can be disposed on an inside surface of the core tube 105. The core liner and outer diameter (surface) of the armature can thus provide the sliding interface between the armature and the core tube 105.

The low friction core liner 120 can be a variety of materials such as ceramic, as well as polymeric materials such as phenolics, acetals, polytetrafluoroethylene (PTFE), ultra high molecular weight polyethylene (UHMWPE), and nylon.

In a further configuration, the low friction coatings can be applied to the outer surface of the armature 108, or the inside surface of the core tube 105 or both to provide the bearing surface between the two components.

As depicted in FIG. 1, when the coil assembly is not powered, the push-pull rod 118 is in a zero, or neutral or center position, which is radially inward from and equally spaced from permanent magnets 102, 104. Push-pull rod 118 is centered at the zero, neutral, or centered position by mechanical positioning or force from compression springs (e.g., meandering springs 103) that are compressed against hard stops or first and second ferromagnetic end sections 130, 132 (e.g., with a spring centered spool valve). Push-pull rod 118 with armature 108 is operable to move to the left or right along the longitudinal axis depending on the electrical input polarity to the excitation coil.

It is contemplated, a bushing or meandering spring can be used in place of, or in conjunction with the first bearing 114 and the second bearing 116, wherein the spring applies a bias on the push-pull rod tending to center the rod at the zero or neutral position.

The hollow core 112 is operable to retain a volume of fluid, such as a liquid or gas including but not limited to hydraulic fluid.

The magnet assembly is located radially outside the core tube 105. The magnet assembly is generally cylindrically shaped and sized to slideably receive the core tube 105 and be slideably received within the excitation coil assembly.

The magnet assembly includes a cylindrically shaped first permanent magnet 102, a second permanent magnet 104 and at least one ferromagnetic spacer(s) 128, wherein the ferromagnetic spacer is axially intermediate the first permanent magnet and the second permanent magnet. Referring to FIG. 22, shown is an exemplary cylindrically shaped permanent magnet 2200 (e.g., first or second permanent magnet 102, 104). In the embodiment depicted in FIG. 22, permanent magnet 2200 is one unitary piece such that permanent magnet 2200 is operable to circumscribe core tube 105. It should be appreciated that in an alternative embodiment, permanent magnet 2200 may not be a single unitary piece, but can comprise a plurality of pieces 2302 that when combined circumscribe the entire outside surface of core tube 105 (shown in FIG. 23). It should be appreciated that while FIG. 23 depicts spaces between each piece 2302, in practice, each piece 2302 will be in contact with the adjacent pieces to circumscribe the outside surface of core tube 105 such that there are no spaces between pieces 2302. In yet another embodiment illustrated at reference character 2304, permanent magnet 2200 comprises a plurality of pieces 2306 that when combined do not fully circumscribe the outside surface of core tube 105. In this embodiment, each piece 2306 is spaced from one another around the outside surface of core tube 105. While FIG. 23 only depicts 4 pieces 2306, it should be appreciated that embodiments include more or less pieces 2306 than 4. In one embodiment, pieces 2306 are evenly spaced around the outside surface of core tube 105. In another embodiment pieces 2306 are not evenly spaced around the outside surface of core tube 105. The magnet assembly is sized to locate the magnets 102, 104 and the ferromagnetic spacer outside the outer diameter of the core tube 105. The components of the magnet assembly can be connected or bonded together or assembled and retained in an operable position about the core tube 105. The at least one ferromagnetic spacer 128 contacts magnets 102, 104 and is located approximately centered over ferromagnetic spacer 122 as shown in FIG. 1. Embodiments of ferromagnetic spacer 122 including a non-ferrous section intermediate along the longitudinal axis of ferromagnetic spacer 122. In this embodiment, ferromagnetic spacer 122 (shown in FIG. 12) includes ferromagnetic spacer 1208 and ferromagnetic spacer 1210. Longitudinally intermediate ferromagnetic spacer 1208 and ferromagnetic spacer 1210 is non-ferrous spacer 1212. Non-ferrous spacer 1212 can be made of any non-ferrous material, such as a non-ferrous metal. Non-ferrous spacer 1212 is bonded or affixed to ferromagnetic spacer 1208 and ferromagnetic spacer 1210 such that a sealed interface is created between ferromagnetic spacer 1208, non-ferrous spacer 1212 and ferromagnetic spacer 1210 operable to prevent a fluid from passing through the sealed interface.

As shown in FIG. 1, the magnets 102, 104 are oriented along the longitudinal axis such that like poles of the magnets are nearest or facing each other. Referring to FIG. 1, the south pole of each magnet 102, 104 are facing one another. Alternative embodiments include the north pole of each magnets 102, 104 facing one another. The magnets 102, 104 are longitudinally spaced from one another along the longitudinal axis by the at least one ferromagnetic spacer 128. In this regard, the magnets 102, 104 are positioned such that like magnetic poles are facing one another and separated by the at least one ferromagnetic spacer 128. In other words, the at least one ferromagnetic spacer 128 is longitudinally intermediate magnet 102 and magnet 104. As shown in FIG. 1, the at least one ferromagnetic spacer 128 is located at the same or common longitudinal position and has the same approximate longitudinal dimension as the ferromagnetic spacer 122. Embodiments include two or more ferromagnetic spacers 128 located longitudinally between magnets 102, 104. Embodiments further include ferromagnetic spacer 128 including a gap between the ferromagnetic spacers 128. For example, as shown in FIG. 12, ferromagnetic spacer 128 includes ferromagnetic spacer 1202 and 1204 each spaced from one another along the longitudinal axis by gap 1206. Embodiments include gap 1206 having a vacuum, being made of air, non-magnetic gaseous materials, or non-magnetic materials. In this regard, the interior facing lateral sides of ferromagnetic spacers 128 that are facing one another would be in contact with vacuum, air or other non-magnetic gaseous materials. In this embodiment, the location of the ferromagnetic spacers 1202 and 1204 with respect to one another are maintained such that the size or volume of the gap 1206 remains constant by a spring 1214. Spring 1214 is in contact with the face of ferromagnetic spacers 1202 and 1204 that face each other to urge ferromagnetic spacers 1202, 1204 away from one another to maintain gap 1206. Embodiments of spring 1214 include a wave spring, o-ring, or any other non-magnetic spring. In another embodiment, gap 1206 can be replaced with a non-ferrous material, such as a metal. In this embodiment, the interior facing lateral sides of ferromagnetic spacers 128 that are facing one another would be in contact with a non-ferrous material, such a non-ferrous metal.

It is contemplated the magnets 102, 104 and the spacer 128 can be operably retained by bonding or mechanical retention. For example, in one configuration the magnets 102, 104 can be maintained in place through the use of a bonding agent. In one embodiment, the bonding agent is an epoxy. Embodiments of the bonding agent include any type of adhesive operable to maintain a location of magnets 102, 104 relative to core tube 105 during operation. Alternatively, as set forth below the magnets 102, 104 can be operably retained by a bias mechanism, such as a by a spring as shown in FIG. 2.

Embodiments of ferromagnetic spacer 128 are made of ferromagnetic materials. Some non-limiting embodiments of ferromagnetic materials include alloy low carbon steels and ferritic stainless steels.

With respect to the core tube 105, the magnets 102, 104 are respectively spaced radially outward from the inside surface of the hollow core 112 as shown in FIG. 1 by the two non-ferromagnetic spacers 124, 126. The ferromagnetic spacer 122 is located radially inward of and longitudinally intermediate magnets 102, 104 along the inside surface of the hollow core 112. Non-ferromagnetic spacer 124 is located radially inward and adjacent to magnet 102 along the inside surface of core tube 105. In other words, non-ferromagnetic spacer 124 and a portion of magnet 102 occupy a common position along the longitudinal axis of device 100. Non-ferromagnetic spacer 126 is located radially inward and adjacent to magnet 104 along the inside surface of core tube 105. In other words, non-ferromagnetic spacer 126 and a portion of magnet 104 occupy a common position along the longitudinal axis of device 100.

The shoulders 138, 140 of the respective ferromagnetic end pieces 130, 132 axially extend into the respective non-ferromagnetic sections 124, 126 along the inside surface of hollow core 112 such that the radially outside portion of ferromagnetic end pieces 130, 132 terminates longitudinally at approximately the longitudinal end of the magnets 102, 104, while the shoulders (protrusions) 138, 140 extend passed the lateral edge of magnets 102, 104 to terminate within the longitudinal dimension of the respective magnet. The protrusions 138, 140 do not extend further than the entire length of magnets 102, 104, respectively along the longitudinal direction. Embodiments of device 100 do not require magnets located at the end of the stroke length of armature 108 that are meant to alter the magnetic forces acting on the armature 108.

The excitation coil assembly includes a housing, a frame within the housing and a wound coil 106 disposed about the frame, wherein the assembly is disposed radially outward from the magnets 102, 104 and thus is disposed about and encompasses the magnets and the core tube 105. The wound coil 106 is operable to have a current passed through the coil to create a magnetic flux. Some non-limiting embodiments of wound coil 106 can be made of copper or aluminum insulated magnet wire. Embodiments also include the wound coil 106 being operable to conduct a current by a pulse-width modulation signal. The direction of movement of armature 108 is determined by the polarity of the electrical current applied to the wound coil 106, the direction of the winding of the wound coil, and the orientation of the polarity of magnets 102, 104.

The armature 108 has an approximate zero, center, or neutral position relative to magnets 102, 104 which is depicted in FIG. 1. The zero, center, or neutral position of the armature 108 is when the armature is located longitudinally symmetrically centered with respect to the magnets and the at least one ferromagnetic spacer 122. Embodiments include ferromagnetic spacer 122 including two or more ferromagnetic spacers. The armature 108 is operable to move longitudinally through the hollow core 112 of the core tube 105 along the longitudinal axis of device 100 from left or right from the zero, center, or neutral position, as seen in FIG. 1. The direction the armature 108 moves is dependent on the polarity of the current that passes through wound coil 106 and the orientation of the magnets 102, 104.

In one embodiment, the bearings 114, 116 are replaced with meandering springs 103 (shown in FIG. 11). Embodiments of the meandering springs 103 are operable to aid in centering the armature 108 to its zero, center, or neutral position relative to magnets 102, 104 and ferromagnetic spacer 122 when no current is passing through the wound coil 106. The meandering spring 103 is thus operable to aid in centering the armature 108 by physically urging and moving rod 118 with the armature 108 to its zero, center, or neutral position.

Referring to FIG. 2, shown is an alternative embodiment of device 100 suitable for performing exemplary embodiments of the present disclosure. Illustrated in FIG. 2 is device 200 in the configuration of a solenoid having a fixed excitation coil assembly having a wound coil 206, a fixed magnet assembly with magnets 202, 204, with a ferromagnetic spacer 228, a core tube 205, and a ferromagnetic armature assembly.

The core tube 205 includes a ferromagnetic spacer 222 longitudinally intermediate non-ferromagnetic spacers 224, 226, which in turn are respectively bounded by first and second ferromagnetic end pieces 223, 225.

In the fixed magnet assembly of this embodiment, a ferromagnetic spacer 228 is longitudinally intermediate the magnets 202, 204, which in turn are longitudinally bounded by ferromagnetic ends pieces 236, 238 respectively.

In this configuration each of the first and second ferromagnetic end pieces 223, 225 includes a respective axially extending protrusion or shoulder 338, 340 mating with a corresponding axial shoulder 339, 341 of the respective first and second non-ferromagnetic sections 224, 226, wherein the shoulders 338, 340 are radially inward of the shoulders 339, 341 and form a portion of the inside surface of core tube 205. In this regard, the ferromagnetic end piece 223 radially underlies a portion of the non-ferromagnetic section 224 and the ferromagnetic end piece 225 radially underlies a portion of the non-ferromagnetic section 226. The longitudinal dimension of the shoulder with respect to the radially outward magnet is between approximately 20% to 80% of the axial dimension of the magnet.

The first and second non-ferromagnetic sections, spacers 224, 226 thus have an inner longitudinal dimension and an outer longitudinal dimension, wherein the outer longitudinal dimension is greater than the inner longitudinal dimension.

Axial retention of the ferromagnetic spacer 228 and the bounding magnets 202, 204, which in turn are longitudinally bounded by ferromagnetic ends pieces 236, 238 can be accomplished by a bias mechanism, such as a spring 234. The spring 234 is operable to be located between a portion of the coil assembly and one of the ferromagnetic end pieces 236 and/or 238 such that the spring urges and maintains a force on the magnets 202, 204, the ferromagnetic spacer 228, and the ferromagnetic ends 236. In one embodiment, the spring 234 is a Belleville spring.

In this embodiment, the wound coil assembly, the magnets 202, 204, the ferromagnetic spacer 228, and the ferromagnetic ends 230, 236 are operable to slideably move along the longitudinal axis over the core tube 205 including the ferromagnetic spacer 222, and the non-ferromagnetic spacers 224, 226 such that coil assembly (e.g., in the event of failure of wound coil 206) can be removed without needing to disassemble the core tube 205. This embodiment thus allows replacement of the wound coil 206, and/or the magnets 202, 204 without the risk of fluid leaking from the hollow core 212.

In this regard, the core tube 205 defines an inner surface that is a sealed surface. Embodiments further include the core tube 205 defining an inner surface that is a fluid tight surface, which substantially prevents the passage of fluid there through. Additionally, the magnets 202, 204 are removeable such that they can be replaced without disrupting the integrity of the core tube 205. The magnets 202, 204 are mounted with a close slip fit I.D. of magnet to O.D. of core tube 205 Embodiments include the core tube 205 (including the non-ferromagnetic sections or spacers, and the intermediate ferromagnetic spacer) being retained in place by an end nut or similar mechanical retention device. Thus, the wound coil 206 can be removed without fluid leaking from hollow core 212 because the core tube 205 (including non-ferrous spacers 224, 226, and ferrous spacer 222) remains intact. In this embodiment, magnets 202, 204 ferrous spacers 228, 236 and spring 234 are operable to slideably receive core tube 205, and wound coil assembly including the wound coil 206 is operable to slideably receive the magnets 202, 204 ferrous spacers 228, 236 and spring 234.

Embodiments of device 200 and device 100 provide that core tube 105, 205 are operable to maintain a high internal fluid pressure between 0 to 30,000 PSIA. However, it should be appreciated that embodiments include an internal core tube 105 fluid pressure greater than 30,000 PSIA. Embodiments provide that the core tube 105 has a diameter ranging between 0.25 to 1.250 inches. However, it should be appreciated that embodiments includes a core tube 105 having a diameter that is smaller than 0.25 inches or greater than 1.250 inches. Embodiments provide that core tube 105 has an internal diameter is generally smaller than present cores due to the placement of magnets 102, 104 (or 202, 204), which allows for a thinner core tube 105 wall is operable to maintain a higher working pressure within the hollow core 112. Embodiments of magnets 102, 104 (and 202, 204) include each being comprised of a single magnet and may be formed of a plurality of magnets stacked on one another.

Thus, the magnets are longitudinally aligned with the non-ferromagnetic sections and are coincident with the longitudinal dimension of the outer surface of the non-ferromagnetic sections. The ferromagnetic spacer of the core tube, longitudinally intermediate the non-ferromagnetic sections of the core tube is longitudinally aligned with the ferromagnetic spacer of the magnet assembly which spacer is longitudinally intermediate the first and second magnet. The core tube thus includes two non-ferromagnetic sections which bound a ferromagnetic spacer there between and in turn are longitudinally bounded by ferromagnetic end pieces, wherein the components are fused together to form a pressure vessel. It should be appreciated that while the embodiments described in FIGS. 1-2 include a core tube having separate non-ferromagnetic sections, and a ferromagnetic spacer, embodiments include the core tube being a single homogenous tube having non-ferromagnetic portions separated by a homogenous ferromagnetic portion. In this regard, embodiments include both a core tube being a single homogenous core and a core tube wherein each non-ferromagnetic section and ferromagnetic spacer is a separate element that is non-homogenous.

Embodiment of device 100 and device 200 are operable such that a magnetic field or magnetic flux is created when current passes through wound coil 106. The magnetic flux urges or causes armature 108 (with rod 118) to move through the longitudinal axis of hollow core 112. The distance through which armature 108 moves is referred to as the stroke length. Embodiments of the present disclosure provide an increased stroke length of between 0.01 to 0.25 inches. Embodiments of the present disclosure provide an increase stroke length of greater than 0.25 inches. Embodiments provide that device 100 is operable to cause or urge armature 108 to move in one direction through core tube 105 along the longitudinal axis of device 100 in response to the current flowing through wound coil 106 having a first polarity. Embodiments provide that device 100 is operable to cause or urge armature 108 to move in an opposite direction through core tube 105 along the longitudinal axis of device 100 in response to the current flowing through wound coil 106 having a second polarity. In this embodiment, the first polarity is different from the second polarity. In this regard, embodiments of device 100 are operable to cause armature 108 to move in both (push and pull) directions through the longitudinal axis of core tube 105. That is, the solenoid assembly can provide bidirectional movement by reversing the polarity to the single wound coil.

Referring to FIG. 3, shown is a graph illustrating a stroke curve in the pull direction of a device suitable for use in practicing exemplary embodiments of the present disclosure. The graph shown in FIG. 3 indicates the stroke length in inches along the x-axis and pounds of force along the y-axis. Each curve on the graph illustrates how force from a device 100 changes over a given stroke length in the pull direction while a particular current (i.e., amps) is passed through the wound coil 106. As depicted, the force stroke curve for 100 milliamps, 200 milliamps, 300 milliamps, 400 milliamps, 500 milliamps, 600 milliamps, 700 milliamps, 800 milliamps, 900 milliamps, 1000 milliamps, and 1100 milliamps are shown. Embodiments provide that a particular position of the armature 108 relative to the core tube 105 can be controlled by the flow of current through wound coil 106 up to at least a stroke length of 2.5 mm. Stroke length refers to the total distance traveled along the longitudinal axis of the device 100 of the armature 108 relative to the core tube 105 in a single direction. It should be appreciated that the force stroke curve lines shown in FIG. 3 relate to the device 100 having the magnets 102, 104 wherein the south pole of the magnets are facing one another. The spring constant associated with spring 234 will affect the stroke length to the extent that the spring constant of spring 234 enables spring 234 to oppose movement forces of armature 108 based on the applied milliamps to the wound coil.

Referring to FIG. 4, shown is a graph illustrating another stroke curve in the push direction of a device suitable for use in practicing exemplary embodiments of the present disclosure. The graph shown in FIG. 4 indicates the stroke length in inches along the x-axis and pounds of force along the y-axis. Each curve on the graph illustrates how force from a device 100 changes over a given stroke length in the push direction while a particular current (i.e., amps) is passed through the wound coil 106. As depicted, the force stroke curve for 100 milliamps, 200 milliamps, 300 milliamps, 400 milliamps, 500 milliamps, 600 milliamps, 700 milliamps, 800 milliamps, 900 milliamps, 1000 milliamps, and 1100 milliamps are shown. Embodiments provide that a particular position of the armature 108 relative to the core tube 105 can be controlled by the flow of current through the wound coil 106 up to at least a stroke length of 2.5 mm. It should be appreciated that the force stroke curve lines shown in FIG. 3 relate to the device 100 having the magnets 102, 104 wherein the south pole of magnets are facing one another.

Referring to FIG. 9, shown is a graph illustrating a stroke curve of a device with reversed polarity in the push direction suitable for use in practicing exemplary embodiments of the present disclosure. FIG. 10 is a graph illustrating a stroke curve of a device with reversed polarity in the pull direction. Reversed polarity refers to the device 100 having the magnets 102, 104 wherein the north poles of the magnets are facing one another. The graphs shown in FIGS. 9 and 10 indicate the stroke length in inches along the x-axis and pounds of force along the y-axis. Each curve on the graphs illustrate how force from a device 100 changes over a given stroke length in the pull direction while a particular current (i.e., amps) is passed through the wound coil 106. As depicted, the force stroke curve for 100 milliamps, 200 milliamps, 300 milliamps, 400 milliamps, 500 milliamps, 600 milliamps, 700 milliamps, 800 milliamps, 900 milliamps, 1000 milliamps, and 1100 milliamps are shown.

Referring to FIG. 5, shown is a cross-sectional view of an alternative embodiment of a device suitable for use in practicing exemplary embodiments of the present disclosure. Shown in FIG. 5 is device 500 having magnets 502, 504, a wound coil 506, ferromagnetic spacers 508, 510, non-ferromagnetic spacers 512, 514, ferromagnetic ends 516, 518, and an armature 520. In this embodiment there is no physical stop for the movement of armature 520 along the pull direction (indicated by line 522). This embodiment includes a gap 524 which allows armature 520 to have a greater range of movement in the pull direction than in the push direction since ferrous end 518 provides a physical stop for armature 520 in the push direction. Embodiments provide that gap 524 allows for movement of armature 520 along the pull direction to be greater than 0.125 inches from armature 520's zero position. Embodiments provide that gap 524 allows for movement of armature 520 along the pull direction to be greater than. Embodiments of device 500 provide that wound coil 506 is operable to have a current passed through it, which creates a magnetic flux that is operable to urge or move armature 520 through the longitudinal axis of core tube 505. The magnetic flux created by the current that passes through wound coil 506 is shown by concentric lines 526. Due to gap 524, concentric lines 526 do not extend into hollow core 528 of device 500. Embodiments provide that core tube 505 is operable to maintain a fluid (e.g., liquid and/or gas) that allows for movement of armature 520 through hollow core 528. Embodiments provide that core tube 505 is operable to maintain a gaseous media that allows for movement of armature 520 through hollow core 528.

Referring to FIG. 6, shown is a cross-sectional view of the alternative embodiment of a device in the push direction suitable for use in practicing exemplary embodiments of the present disclosure. Shown in FIG. 6 is device 600 having magnets 602, 604, wound coil 606, ferrous spacers 608, 610, non-ferrous spacers 612, 614, ferrous ends 616, 618, and armature 620. This embodiment also includes a gap 624 which allows armature 620 to have a greater range of movement in the pull direction (shown in FIG. 5) than in the push direction (indicated by line 622) since ferrous end 618 provides a physical stop for armature 620. Embodiments of device 600 provide that wound coil 606 is operable to have current passed through it, which creates a magnetic flux that is operable to urge or move armature 620 through the longitudinal axis of core tube 605. The magnetic flux created by the current that passes through wound coil 606 is shown by concentric lines 626.

Reference is now made to FIG. 7, which depicts an exemplary graph of a force stroke performance finite element analysis (FEA) curve. This graph shows the performance of embodiments of device 500 with no bearing located in the magnetic circuit path in the pull direction. In other words, there is a gap 524 which allows for greater range of movement in the pull direction for armature 520. As is evident, the force curve performance illustrated in FIG. 7 is relatively the same as that shown in FIG. 3 for a device having no gap located in the pull direction of the armature. Embodiments of device 500 provide that the bearing (e.g., flexible mechanical centering device such as a linear compression spring or meandering spring) located in the pull direction is positioned at a distance from the wound coil 506 such that the bearing does not fall within the magnetic flux path.

Referring to FIG. 8, presented is an exemplary logic flow diagram in accordance with a method, and apparatus for performing exemplary embodiments of this disclosure. Block 800 presents providing a core tube extending along a longitudinal axis, the core tube having a first ferromagnetic end section with a first confronting end longitudinally spaced from a second ferromagnetic end section with a second confronting end, a first nonmagnetic section adjacent the first confronting end and a second nonmagnetic section adjacent the second confronting end, a first ferrous spacer longitudinally intermediate the first nonmagnetic section and the second nonmagnetic section; providing a first magnet and a second magnet located outside the core tube, the first magnet spaced along the longitudinal axis from the second magnet wherein a second ferrous spacer is longitudinally intermediate the first magnet and the second magnet, and wherein the first nonmagnetic section is radially inward of the first magnet and the second nonmagnetic section is radially inward of the second magnet, and the first ferrous spacer is radially inward of the second ferrous spacer; and providing an excitation coil disposed radially outward of the first magnet and the second magnet. Block 802 relates to wherein the first ferrous spacer is located at approximately the same longitudinal position as the second ferrous spacer.

Some of the non-limiting implementations detailed above are also summarized at FIG. 8 following block 802. Block 804 specifies wherein proximal poles of the first magnet and the second magnet are like. Block 806 states wherein the first nonmagnetic section contacts the first confronting end of the first ferromagnetic end section of the core tube. Then block 808 relates to wherein the second nonmagnetic section contacts the second confronting end of the second ferromagnetic end section of the core tube. Next block 810 relates to wherein the first nonmagnetic section contacts the first confronting end of the ferromagnetic end section of the core tube such that a portion of the first ferromagnetic end section of the core tube radially underlies a portion of the first nonmagnetic section. Then block 812 states wherein the second nonmagnetic section contacts the second confronting end of the second ferromagnetic end section of the core tube such that a portion of the second ferromagnetic end section of the core tube radially underlies a portion of the second nonmagnetic section.

The logic diagram of FIG. 8 may be considered to illustrate the operation of a method, a result of execution of computer program instructions stored in a computer-readable medium. The logic diagram of FIG. 8 may also be considered a specific manner in which a device is formed, whether such a device is a solenoid, or other device, or one or more components thereof.

Embodiments of the present disclosure provide a solenoid having a single wound coil (or excitation coil) that is operable to conduct a current which creates a magnetic flux through the solenoid to move an armature. Embodiments further include a single coil solenoid having two magnets that are radially between a radially exterior wound coil and a radially interior core tube. Embodiments include a single coil solenoid, wherein the two magnets are spaced from one another longitudinally by a ferromagnetic material. Embodiments include a single coil solenoid, wherein the two magnets are radially outward from two non-ferromagnetic materials. Embodiments of the present disclosure include a single coil solenoid having a ferromagnetic armature operable to move in both the push and pull direction along the longitudinal axis of the solenoid between two bearings that form a portion of the solenoid core tube. Embodiments of the present disclosure provide a single coil solenoid, wherein one direction of movement of the armature is obstructed and wherein the opposite direction of movement of the armature is unobstructed. Embodiments include a single coil solenoid having two magnets that are maintained in place relative to the core tube by a spring, and wherein the two magnets are removeable from the core tube.

Embodiments of the present disclosure present a tubular solenoid assembly, which permits movement in the push and pull directions. Embodiments provide movement of an armature of +/−2.5 mm relative to the armature's center location. It should be appreciated, that embodiments of the present disclosure provide that movement of an armature relative to its center location can be less than or greater than +/−2.5 mm. Embodiments of the present disclosure provide for high internal fluid pressure within a core tube of a solenoid in which that the armature resides. Embodiments provide an internal fluid pressure of core tube between 030,000 PSIA. However, embodiments provide an internal fluid pressure of core tube greater than 30,000 PSIA. Embodiments provide a device having a magnetic core tube constructed with non-magnetic breaks that allow magnetic flux to pass through the armature into the core wall to provide a proportional like force output performance with current changes applied over its stroke range with no obstructions in the movement of the armature. Embodiments provide a tubular solenoid assembly wherein the amount of force generated from movement of the armature with push-pull rod varies proportionally based on the applied milliamps to the wound coil over the stroke length. That is, the core tube, while being predominantly ferromagnetic includes two non-ferromagnetic breaks along the longitudinal axis, wherein the non-ferromagnetic breaks allow for magnetic flux to pass through the armature into the wall of the core tube to provide a proportional like force output performance over the designed stroke range without requiring fixed stop gaps as employed in the prior art. The present tubular solenoid design provides movement similar to a moving magnet actuator, without the drawbacks of the moving magnet actuator.

Reference is now made to FIG. 13, which illustrates a cross-sectional view of another exemplary device 1300. Shown in FIG. 13 is device 1300 having a core tube 1305 that includes ferromagnetic spacer 1322 and non-ferromagnetic spacers 1324, 1326. Radially outside core tube 1305 are magnets 1302, 1304 separated by ferromagnetic spacer 1328. In the embodiment shown in FIG. 13, ferromagnetic spacer 1328 includes a gap 1330, however, it should be appreciated that embodiments include ferromagnetic spacer 1328 being made of a single solid material without a gap. Radially outside magnets 1302, 1304 is wound coil 1306.

Also shown in FIG. 13 is armature 1308. Armature 1308 includes inwardly radially angled sides 1350, 1352 that are shaped such that each radial end of armature 1308 along its longitudinal axis are conically shaped. Core tube 1305 includes angled shoulders 1338, 1340 that are angled radially inward to correspond to the angled sides 1350, 1352. Angled shoulders 1338, 1340 extend radially underneath non-ferromagnetic spacers 1324, 1326 within hollow core 1312. However, angled shoulders 1338, 1340 do not extend underneath the entire length of non-ferromagnetic spacers 1324, 1326. In this regard, angled shoulders 1338, 1340 only underlie a portion of non-ferromagnetic spacers 1324, 1326.

Referring to FIG. 14, which illustrates a cross-sectional view of another exemplary device 1400. Shown in FIG. 14 is device 1400 having a core tube 1405 that includes ferromagnetic spacer 1422 and non-ferromagnetic spacers 1424, 1426. Radially outside core tube 1405 are magnets 1402, 1404 separated by ferromagnetic spacer 1428. In the embodiment shown in FIG. 14, ferromagnetic spacer 1428 includes a gap 1430, however, it should be appreciated that embodiments include ferromagnetic spacer 1428 being a single piece without a gap 1430. Radially outside magnets 1402, 1404 is wound coil 1406. Also shown is armature 1408 operable to move through the hollow core 1412. Armature 1408 includes indentations 1450, 1452 located on the long ends of armature 1408. Core tube 1405 includes protruding surfaces 1438, 1440 on either side of armature 1408. Protruding surfaces 1438, 1440 correspond to the indentations 1450, 1452 located on the longitudinal axis ends of armature 1408 such that protruding surfaces 1438, 1440 fit within indentations 1450, 1452. Embodiments include the protruding surfaces 1438, 1440 being cone shaped and indentations 1450, 1452 being inwardly cone shaped to correspond with the shape of protruding surfaces 1438, 1440.

Referring now to FIG. 15, shown is a cross-sectional view of another exemplary device 1500. Shown in FIG. 15 is device 1500 having a core tube 1505 that includes ferromagnetic spacer 1522 and non-ferromagnetic spacers 1524, 1526. Radially outside core tube 1505 are magnets 1502, 1504 separated by ferromagnetic spacer 1528. In the embodiment shown in FIG. 15, ferromagnetic spacer 1528 includes an gap 1530. It should be appreciated that embodiments include ferromagnetic spacer 1528 being made of a single piece without a gap 1530. Radially outside magnets 1502, 1504 is wound coil 1506.

Device 1500 also includes armature 1508 operable to move through the hollow core 1512. Armature 1508 includes flat edges 1550, 1552 located on the long ends of armature 1508. Core tube 1505 includes flat ends 1538, 1540 on either side of armature 1508. Flat ends 1538, 1540 have a surface shape that corresponds to the flat edges 1550, 1552. Embodiments include flat edges 1550, 1552 being substantially 90 degrees from the radial surface of armature 1508. In this embodiment, flat ends 1538, 1540 is positioned to correspond to flat edges 1550, 1552 such that flat ends 1538, 1540 are substantially parallel to flat edges 1550, 1552. In this embodiment, core tube 1505 is made of a single unitary piece of stainless steel (e.g., chromium-nickel-aluminum, austenitic stainless steel 17-7 PH) rather than having multiple pieces of ferromagnetic and non-ferromagnetic material that are welded together. In this embodiment, the core tube 1505 is annealed such that a portion of core tube 1505 portions becomes non-magnetic (e.g., spacers 1524, 1526). In other words, embodiments of core tube 1505 include having a uniform integral one-piece design and then annealing the portion of the core tube 1505 radially inward from magnets 1502, 1504 such that those annealed areas exhibit non-ferromagnetic or non-magnetic properties.

Reference is now made to FIG. 16, which shown is a cross-sectional view of another exemplary device 1600. Shown in FIG. 16 is device 1600 having a core tube 1605 that includes non-ferromagnetic spacer 1624. Radially outside core tube 1605 are magnets 1602, 1604 separated by ferromagnetic spacer 1628. In the embodiment shown in FIG. 16, ferromagnetic spacer 1628 includes a gap 1630. Embodiments include ferromagnetic spacer 1628 being a single piece without a gap 1630. Radially outside magnets 1602, 1604 is wound coil 1606. As illustrated in FIG. 16, core tube 1605 is made of a single non-ferromagnetic material since it does not include any ferromagnetic spacers within the core tube 1605. Accordingly, magnets 1602, 1604 are located radially outside from a non-ferromagnetic core tube 1605. Likewise, ferromagnetic spacer 1628 with gap 1630 are located radially outside non-ferromagnetic core tube 1605. It should be appreciated that in this embodiment, magnetic flux created by current passing through coil 1606 will not pass through core tube 1605 as easily as the embodiments set forth above, which may cause the force created by movement of armature 1608 to be less than that found in the other embodiments.

Device 1600 also includes armature 1608 operable to move through the hollow core 1612. Armature 1608 includes steps 1650, 1652 located on the radial edge of armature 1508 such that steps 1650, 1652 circumscribe the radial edge of armature 1608. Core tube 1605 includes ridges 1638, 1640 on either side of armature 1508. Ridges 1638, 1640 have a shape that corresponds to the steps 1650, 1652 such that ridges 1638, 1640 are sized to fit within steps 1650, 1652, respectively. Embodiments include steps 1650, 1652 extending along the long axis (the long axis is the same axis that armature 1608 is operable to move through) such that the steps 1650, 1652 only extend through a portion of the long axis of armature 1608. In this regard, steps 1650, 1652 do not extend the entire length of armature 1608. Embodiments include steps 1650, 1652 being positioned relative to the core tube 1605 end piece such that the core tube 1605 end piece is substantially 90 degrees with respect to steps 1650, 1652. Likewise, embodiments include ridges 1638, 1640 are positioned substantially 90 degrees with respect to the long axis edge of armature 1608.

Referring to FIG. 17, shown is a cross-sectional view of another exemplary device 1700. Shown in FIG. 17 is device 1700 having a core tube 1705 that is made of a single unitary non-ferromagnetic material. Radially outside core tube 1705 are magnets 1702, 1704 separated by ferromagnetic spacer 1728. Ferromagnetic spacer 1728 includes a gap 1730. Although shown as having a gap 1730, embodiments include ferromagnetic spacer 1728 being a single piece without a gap 1730. Radially outside magnets 1702, 1704 is wound coil 1706. Also shown in FIG. 17 is armature 1708 operable to move through the longitudinal axis of device 1700. Armature 1708 includes bores 1750, 1752 located on the longitudinal ends of armature 1708. Bores 1750, 1752 are defined by the radial edge 1754 of armature 1708 such that radial edge 1754 extends along the longitudinal axis further than bore 1750, 1752. Core tube 1705 includes extensions 1738, 1740 which extend longitudinally inward toward armature 1708. Extensions 1738, 1740 are spaced from the radial inside surface of core tube 1705. Thus, the radial edge of extensions 1738, 1740 and the radial inside surface of core tube 1705 define a space 1760, 1762, respectively. Space 1760, 1762 are sized to maintain or accommodate radial edge 1754. Likewise, bores 1750, 1752 are sized to maintain or accommodate extensions 1738, 1740.

Reference is now made to FIG. 18, which shows a cross-sectional view of another exemplary device 1800. Illustrated in FIG. 18 is device 1800 having an excitation coil 1806, an armature 1808, and a core tube 1805 including ferromagnetic spacer 1822 and non-ferromagnetic spacers 1824, 1826. Radially outside core tube 1805 are magnets 1802, 1804 separated by ferromagnetic spacer 1828. Armature 1808 is operable to move through the cavity 1803 defined by core tube 1805 in either the push or pull direction in response to current passing through excitation coil 1806. Ferromagnetic spacer 1828 includes a gap 1830. Although shown as having a gap 1830, embodiments include ferromagnetic spacer 1828 being a single piece without a gap 1830. In the embodiment shown in FIG. 18, gap 1830 is located approximately in the midsection or middle of spacer 1828. However, it should be appreciated that gap 1830 can be located adjacent to the midsection of spacer 1828. Radially outside magnets 1802, 1804 is wound coil 1806. Device 1800 also includes armature 1808 operable to move through the longitudinal axis (as indicated by line 1809) of device 1800.

Reference is now made to FIG. 19, which illustrates a close-up cross-sectional view of device 1800. Similar to FIG. 18, FIG. 19 depicts magnets 1802, 1804, ferromagnetic core tube 1805, ferromagnetic spacer 1822, ferromagnetic spacer 1828 with gap 1830 and non-ferromagnetic spacers 1824, 1826. The core tube 1805 includes two channels 1811, 1813 that circumscribe the radial outside surface of core tube 1805. Channels 1811, 1813 each include at least a first surface 1815, 1817 that is angled radially inward toward spacer 1822 (e.g., between 5 degrees to 60 degrees from the surface of core tube 1805), and a second surface 1819, 1821 angled radially outward toward spacer 1828. Each channel 1811, 1813 is comprised of non-ferromagnetic material that form spacers 1824, 1826, respectively. In other words, spacers 1824, 1826 are not uniformly the same radial thickness along the longitudinal direction. Rather, the radial thickness of spacers 1824, 1826 changes along the longitudinal direction. As shown in FIG. 19, non-ferromagnetic spacers 1824, 1826 do not have the same length along the longitudinal axis as magnets 1802, 1804. Rather embodiments include spacers 1824, 1826 being coextensive with the portion of magnets 1802, 1804 that is in contact with spacer 1822, but do not extend the entire length of magnets 1802, 1804 in the longitudinal direction. In other words, spacers 1824, 1826 terminate (i.e., the diameter of core tube 1805 returns to the same uniform diameter) or have a length that is shorter in the longitudinal direction than magnets 1802, 1804. This also means that core tube 1805 extends radially underneath a portion of magnets 1802, 1804. Embodiments include core tube 1805 extending radially underneath 25% to 50% of the length of magnets 1802, 1804 in the longitudinal direction.

Referring to FIG. 20, shown is a cross-sectional view of another embodiment of device 2000 suitable for practicing embodiments of this disclosure. Illustrated in FIG. 20 is a cross-sectional view of device 2000 having magnets 2002, 2004, ferromagnetic core tube 2005, ferromagnetic spacer 2022, armature 2008, ferromagnetic spacer 2028 with gap 2030 and channel gaps 2024, 2026. As illustrated in FIG. 20, spacer 2022 is approximately the same length in the longitudinal direction as spacer 2028 such that a portion of spacer 2022 is radially inward from magnets 2002, 2004. It should be appreciated that in the embodiment shown in FIG. 20 channel gaps 2024, 2026 are defined by the space between the outer radial surface of core tube 2005 (i.e., created by the shunt or channel) and the inner radial surface of magnets 2002, 2004, respectively. Channel gaps 2024, 2026 are created by the outer radial diameter of core tube 2005 decreasing along angled surfaces 2032, 2034 (e.g., between 5 degrees to 60 degrees relative to the outer radial surface of core tube 2005) and then increasing along angled surface 2036, 2038. Embodiments of channel gaps 2024, 2026 can be formed by removing a portion of the core tube 2005 radially inward from magnets 2002, 2004 such that a channel that circumscribes the outside radial surface of core tube 2005 is formed. It should be appreciated that the thickness (i.e., distance between the outside radial surface of core tube 2005 and the radial outside surface of channel gaps 2024, 2026) is less than the wall thickness of core tube 2005. In other words, channel gaps 2024, 2026 do not create a passageway between the interior and the exterior of core tube 2005. Rather, a portion of core tube 2005 remains radially inward from magnets 2002, 2004. As depicted in FIG. 20, channel gaps 2024, 2026 do not have the same length in the longitudinal direction as magnets 2002, 2004. Thus, a portion of core tube 2005 extends radially inward from magnets 2002, 2004. It should be appreciated that embodiments include channel gaps 2024, 2026 have a length in the longitudinal direction equal to magnets 2002, 2004 such that channel gap 2024 is coextensive with magnet 2002 and channel gap 2026 is coextensive with magnet 2004. As shown in FIG. 20, channel gaps 2024, 2026 are located radially inward and adjacent to spacer 2028, however, embodiments include channel gaps 2024, 2026 being located spaced from spacer 2028 in the longitudinal direction. In this embodiment, core tube 2005 is made of a single piece of ferromagnetic or steel material, which aides in maintaining the structural integrity of core tube 2005 and the ability for core tube 2005 to maintain a higher internal core pressure.

Armature 2008 as shown in FIG. 20 is in the centered position relative to coil 2006. Armature is made of a ferrous material and is operable to move in both directions through the longitudinal axis 2009 of core tube 2005. Movement of armature 2008 is restricted by ends 2040, 2042.

Referring now to FIG. 21, shown is an exemplary embodiment of a cross-sectional view of an alternative embodiment of a device suitable for use in practicing exemplary embodiments of the present disclosure. Shown in FIG. 21 is device 2100 having magnets 2102, 2104, a wound coil 2106, ferromagnetic spacer 2122, ferromagnetic spacer 2128, gaps 2124, 2126, ferromagnetic ends 2116, 2118, and an armature 2108. In this embodiment, ferromagnetic spacer 2128 includes an gap 2130 that extends from the outer radial surface of ferromagnetic spacer 2128 to the radially inner surface of ferromagnetic spacer 2128. It should be appreciated that in this embodiment gaps 2124, 2126 are the same length in the longitudinal direction 2109 as magnets 2102, 2104. However, it should also be appreciated that embodiments include gaps 2124, 2126 not being coextensive or having the same length in the longitudinal direction as magnets 2102, 2104. Embodiments of device 2100 provide that wound coil 2106 is operable to have a current passed through it, which creates a magnetic flux that is operable to urge or move armature 2108 through the longitudinal axis 2109 of core tube 2105. The magnetic flux created by the current that passes through wound coil 2106 is shown by concentric lines 2125. As shown in FIG. 21, when current passes through coil 2106, magnetic flux is created and passes through magnets 2102, 2104, ferromagnetic spacers 2128, 2122, core tube 2105, armature 2108 and a portion of gaps 2124, 2126. It should be noted that a portion of gaps 2124, 2126 do not have magnetic flux passing through it. In other words, concentric lines 2125 only partially extend into gaps 2124, 2126.

It should be appreciated that coil 2106 is not located in the center in the longitudinal direction of magnets 2124, 2126, and spacer 2128. Rather, coil 2106 is positioned such that coil 2106 is predominately located radially outside magnet 2106 and to the right of spacer 2128. In this embodiment, when current passes through coil 2106, the force created by the movement of armature 2108 is greater in the direction in which coil 2106 is positioned. In other words, the embodiment depicted in FIG. 21 provides for greater force in the direction to the right. Likewise, embodiments include coil 2106 being positioned predominately radially outside magnet 2104 such that greater force can be produced by the movement of armature 2108 in the opposite direction to the left.

It is to be understood that any feature described in relation to any one embodiment may be used along, or in combination with one or more features of any other of the embodiments. The presently disclosed embodiments are therefore considered in all respects to be illustrative and not restrictive. Furthermore, equivalents and modifications not described above may also be employed without departing from the scope of this disclosure, which is defined in the accompanying claims.

The invention claimed is:

1. A solenoid assembly comprising:
(a) a core tube extending along a longitudinal axis, the core tube having a first ferromagnetic end section with a first confronting end longitudinally spaced from a second ferromagnetic end section with a second confronting end, a first non-ferromagnetic section adjacent the first confronting end and a second non-ferromagnetic section adjacent the second confronting end, a first ferromagnetic spacer longitudinally intermediate the first non-ferromagnetic section and the second non-ferromagnetic section;
(b) a first magnet and a second magnet located outside the core tube, the first magnet spaced along the longitudinal axis from the second magnet wherein a second ferromagnetic spacer is longitudinally intermediate the first magnet and the second magnet, and wherein the first non-ferromagnetic section is radially inward of the first magnet and the second non-ferromagnetic section is radially inward of the second magnet, and the first ferromagnetic spacer is radially inward of the second ferromagnetic spacer; and
(c) an excitation coil disposed radially outward of the first magnet and the second magnet, wherein the first non-ferromagnetic section contacts the first confronting end of the ferromagnetic end section of the core tube such that a first portion of the first ferromagnetic end section of the core tube is in contact with the first non-ferromagnetic section that is longitudinally in a same location as an end of the first magnet and a second portion of the first ferromagnetic end section of the core tube radially underlies a portion of the first non-ferromagnetic section.

2. The solenoid assembly of claim 1, wherein the first ferromagnetic spacer is located at the same longitudinal position as the second ferromagnetic spacer.

3. The solenoid assembly of claim 1, wherein proximal poles of the first magnet and the second magnet are like.

4. The solenoid assembly of claim 1, wherein the first non-ferromagnetic section contacts the first confronting end of the first ferromagnetic end section of the core tube.

5. The solenoid assembly of claim 1, wherein the second non-ferromagnetic section contacts the second confronting end of the second ferromagnetic end section of the core tube.

6. The solenoid assembly of claim 1, wherein the second non-ferromagnetic section contacts the second confronting end of the second ferromagnetic end section of the core tube such that a portion of the second ferromagnetic end section of the core tube radially underlies a portion of the second non-ferromagnetic section.

7. The solenoid assembly of claim 1, wherein the core tube defines a sealed inner surface.

8. The solenoid assembly of claim 1, wherein the core tube defines a fluid tight sealed inner surface.

9. The solenoid assembly of claim 1, wherein the first magnet and the second magnet slideably receive the core tube.

10. The solenoid assembly of claim 1, wherein the excitation coil slideably receives the first and the second magnets.

11. The solenoid assembly of claim 1, further comprising a ferromagnetic armature slideably disposed within the core tube.

12. The solenoid assembly of claim 1, further comprising a ferromagnetic armature slideably disposed within the core tube, the armature carried by a push-pull rod, wherein a first bearing is located between the push-pull rod and the first ferromagnetic end section and a second bearing is located between the push-pull rod and the second ferromagnetic end section to define an operating cavity and the operating cavity retains a volume of fluid.

13. The solenoid assembly of claim 12, wherein the volume of fluid is one of a liquid and a gas.

14. The solenoid assembly of claim 1, wherein the excitation coil consists of a single excitation coil, the single excitation coil operable to create a first magnetic field having a first polarity and a second magnetic field having a second polarity.

15. The solenoid assembly of claim 1, wherein the first non-ferromagnetic section and a portion of the first magnet occupy a common position along the longitudinal axis.

16. The solenoid assembly of claim 1, wherein the second non-ferromagnetic section and a portion of the second magnet occupy a common position along the longitudinal axis.

17. The solenoid assembly of claim 1, further comprising a ferromagnetic armature slideably disposed within the core tube, the armature carried by a push/pull rod, wherein a first bearing is located between the push/pull rod and the first ferromagnetic end section and a second bearing is located between the push/pull rod and the second ferromagnetic end section to define an operating cavity and the operating cavity retains a volume of gaseous media.

18. The solenoid assembly of claim 1, wherein the excitation coil is operable by a pulse-width modulation signal.

19. The solenoid assembly of claim 1, wherein a force produced by the solenoid is proportional to an input current signal to the excitation coil.

20. The solenoid assembly of claim 1, wherein the first ferromagnetic spacer comprises a gap, the gap defined by a radial outer surface of the core tube to a radial inner surface of the second ferromagnetic spacer, wherein the gap is spaced apart longitudinally from the first magnet and the second magnet.

21. The solenoid assembly of claim 1, wherein the first non-ferromagnetic section is defined by a channel forming a gap between a radial outer surface of the core tube and a radial inner surface of the first magnet, and wherein the second non-ferromagnetic section is defined by a channel forming a gap between the radial outer surface of the core tube and a radial inner surface of the second magnet.

22. The solenoid assembly of claim 1, wherein the core tube having the first ferromagnetic end section, the second ferromagnetic end section, the first non-ferromagnetic section and the second non-ferromagnetic section comprise a single integral piece.

23. The solenoid assembly of claim 1, wherein the first non-ferromagnetic section is a first gap defined by a first space between the core tube, the first magnet, and the first ferromagnetic spacer, and wherein the second non-ferromagnetic section is a second gap defined by a second space between the core tube, the second magnet, and the first ferromagnetic spacer.

24. A solenoid assembly comprising:
(a) a core tube comprising a non-ferromagnetic section extending along a longitudinal axis;
(b) a first magnet and a second magnet located outside the core tube, the first magnet spaced along the longitudinal axis from the second magnet wherein a second ferromagnetic spacer is longitudinally intermediate the first magnet and the second magnet, and wherein the non-ferromagnetic section is radially inward of the first magnet and the second magnet, and the non-ferromagnetic section is radially inward of the second ferromagnetic spacer; and
(c) an excitation coil disposed radially outward of the first magnet and the second magnet, wherein the core tube comprises a first ferromagnetic spacer comprising an air gap, the air gap defined by a radial outer surface of the core tube to a radial inner surface of the second ferromagnetic spacer, wherein the air gap is spaced apart longitudinally from the first magnet and the second magnet.

* * * * *